US006765969B1

(12) United States Patent
Vook et al.

(10) Patent No.: US 6,765,969 B1
(45) Date of Patent: Jul. 20, 2004

(54) METHOD AND DEVICE FOR MULTI-USER CHANNEL ESTIMATION

(75) Inventors: Frederick W. Vook, Schaumburg, IL (US); Timothy A. Thomas, Palatine, IL (US)

(73) Assignee: Motorola, Inc., Schaumburg, IL (US)

( * ) Notice: Subject to any disclaimer, the term of this patent is extended or adjusted under 35 U.S.C. 154(b) by 745 days.

(21) Appl. No.: 09/643,541

(22) Filed: Aug. 22, 2000

Related U.S. Application Data

(60) Provisional application No. 60/151,888, filed on Sep. 1, 1999.

(51) Int. Cl.$^7$ .............................................. H04L 27/00
(52) U.S. Cl. ...................... 375/259; 375/295; 375/316
(58) Field of Search ................................ 375/148, 152, 375/259, 260, 267, 285, 346, 347, 349, 299, 295, 316, 340, 350; 370/320, 335, 342, 479; 455/63.1, 65, 67.3, 67.13, 501, 504, 506, 526, 553.1, 101, 103, 132, 134, 135, 226.1, 226.2

(56) References Cited

U.S. PATENT DOCUMENTS

| | | | | |
|---|---|---|---|---|
| 6,101,399 | A | * 8/2000 | Raleigh et al. | ............. 455/561 |
| 6,115,406 | A | * 9/2000 | Mesecher | ................... 375/130 |
| 6,154,443 | A | * 11/2000 | Huang et al. | ................ 370/210 |
| 6,208,842 | B1 | * 3/2001 | Henderson et al. | ....... 455/67.11 |
| 6,215,814 | B1 | * 4/2001 | Ylitalo et al. | ............... 375/148 |
| 6,628,738 | B1 | * 9/2003 | Peeters et al. | .............. 375/371 |

OTHER PUBLICATIONS

Article entitled "Adaptive Frequency–Domain Equalization and Diversity Combining For Broadband Wireless Communications," (Author, Martin V. Clark, *IEEE JSAC*, Vol. 16, pp. 1385–1395, Oct. 1998).

Article entitled "Analysis of DFT–Based Channel Estimators for OFDM*" (Authors Ove Edfors, Magnus Sandell, Jan–Jaap van de Beek, Sara Kate Wilson, Per Ola Börjesson, This work has been presented in part at the 1995 Vehicular Technology Conference (VTC '96) in Chicago, Illinois, Jul. 25–28, 1995, pp. 815–819).

Article entitled "Basis Expansions Models and Diversity Techniques for Blind Identification and Equalization of Time–Varying Channels," (Author Georgios B. Giannakis, *Proc. IEEE*, vol. 86, No. 10, pp. 1969–1986, Oct. 1998).

Article entitled "Channel Estimation for OFDM Systems with Transmitter Diversity in Mobile Wireless Channels" (Authors Ye(Geoffrey) Li, Senior Member, IEEE, Nambirajan Seshadri, Senior Member, IEEE, and Sirikiat Ariyavisitakul, Senior Member, IEEE, pp. 461–471, *IEEE Journal on Selected Areas in Communications*, vol. 17, No. 3, Mar. 1999).

(List continued on next page.)

*Primary Examiner*—Tesfaldet Bocure
*Assistant Examiner*—Khanh cong Tran
(74) *Attorney, Agent, or Firm*—Kenneth A. Haas

(57) ABSTRACT

The invention computes frequency-domain channel gains by compiling a set of estimated channel gains as a function of pilot sequences, a set of analytical channel gains variables, and a set of weighting coefficients variables. A plurality of weighting coefficients are computed as a function of time and frequency correlation functions, a noise correlation matrix, and pilot sequences. A weighting matrix is computed from the weighting coefficients. After receiving a training sequence from at least one transmitter, a received data matrix is computed from the training sequence. The weighting matrix and the received data matrix are used to compute the frequency-domain channel gains. The invention also provides a method for reducing the computational complexity of estimating the time and frequency response of at least one desired signal received by at least one antenna. Also, the time and frequency response of at least one desired signal received by at least one antenna can be both interpolated and predicted with the present invention.

26 Claims, 10 Drawing Sheets

OTHER PUBLICATIONS

Article entitled "Multicarrier Modulation for Data Transmission: An Idea Whose Time Has Come," (Author John A. C. Bingham, *IEEE Comm. Mag.*, vol. 28, pp. 5–14, May 1990).

Article entitled "Robust Channel Estimation for OFDM Systems with Rapid Dispersive Fading Channels," (Authors Ye G. Li, Leonard J. Cimini, Jr., Nelson R. Sollenberger, *IEEE Trans. On Comm.*, vol. 46, pp. 902–915, Jul. 1998).

\* cited by examiner

METHOD AND DEVICE FOR MULTI-USER CHANNEL ESTIMATION

CROSS REFERENCE TO RELATED APPLICATIONS

This application claims priority under 35 U.S.C. 119 to U.S. Provisional Application Serial No. 60/151,888, filed Sep. 1, 1999, and entitle "Method and Device for Multi-user Channel Estimation", the disclosure of which is hereby expressly incorporated herein by reference.

FIELD OF THE INVENTION

The present invention generally relates to the field of communication systems and more particularly, to estimating the time and frequency response of at least one desired signal received by at least one antenna and reducing the computational complexity of estimating the time and frequency response of at least one desired signal received by at least one antenna, interpolating the time and frequency response of at least one desired signal received by at least one antenna, and predicting the time and frequency response of at least one desired signal received by at least one antenna.

BACKGROUND OF INVENTION

In a wireless communication system, a major design challenge is to maximize system capacity and performance in the presence of interference and a time-varying multipath channel. Multipath propagation is caused by the transmitted signal reflecting off objects near the transmitter and receiver and arriving at the receiver over multiple paths. Interference in a communication system can come from a variety of sources depending on the particular system deployment. Interference and multipath are major factors that limit the achievable performance and capacity of a communication system because both effects interfere with the ability of a communication receiver to properly decode the transmitted data.

In a multipath propagation channel, the transmitted signal propagates to the receiver over a finite number $L_p$ of propagation paths, where each path has an associated time delay and complex gain. In such a channel, the communication receiver receives the superposition of $L_p$ delayed, attenuated, and phase-shifted copies of the transmitted signal. The number of paths $L_p$ and their time delays and phase shifts depends on the physical location of the various scattering objects (such as buildings, automobiles, and trees) in the immediate vicinity of the transmitter and receiver. The complex attenuation (magnitude and phase) of each path depends on the length of each path as well as the material composition of any scatterers or reflectors encountered along the path.

The presence of multipath can severely distort the received signal. In a multipath environment, the multiple copies of the transmitted signal can interfere constructively in some portions of the occupied bandwidth. In other portions of the occupied bandwidth, the multiple copies can interfere destructively at the receiver. This interference causes unwanted variations in the received signal strength over the bandwidth occupied by the signal. Furthermore, if the difference in the path delays of the various propagation paths is significantly greater than the duration of a transmitted information symbol, then intersymbol interference is present at the receiver. When intersymbol interference is present, the received signal is corrupted by prior transmitted symbols propagating over paths having delays relative to the shortest path that are longer than the duration of an information symbol. The demodulation process (the process of determining which information symbol was transmitted) becomes difficult in the presence of intersymbol interference.

In a mobile wireless communication system, the complex attenuation of each of the multipath components of the received signal becomes a time-varying function of the transmitter's path and speed throughout the scattering field local to the transmitter's position. The transmitter's motion causes the received signal strength at a particular portion of the occupied bandwidth to vary as time progresses. In a mobile multipath channel, the overall channel response not only varies across the occupied bandwidth of the signal, but also across time as well.

In addition to multipath, interference is another system component that limits the performance of a communication system. If the system is deployed in an unlicensed band, then interference can be generated by other users of the band. In a cellular system employing frequency reuse, co-channel interference can be generated by transmitters in another cell that is allocated the same set of frequency channels. Frequency reuse is the practice of assigning the same frequency channels to multiple users of the allocated spectrum.

Many cellular communication systems employ the technique of frequency reuse in order to maximize the utilization of the frequency spectrum allocated to a wide-area system deployment. In a cellular system, a large geographical area is divided into smaller regions called cells, where each cell is served by a single base station operating on an assigned set of frequency channels. Within each cell, multiple subscriber devices are allowed to communicate with the base station on the frequency channels assigned to that cell. The concept of frequency reuse involves allocating different sets of frequency channels to the cells belonging to a particular group and then reusing the same sets of frequencies to the cells belonging to another group of cells.

The reuse factor of a cellular system is defined to be the minimum distance between two cells that are allocated the same set of frequency channels divided by the radius of a cell. A cellular system employing a large reuse factor does not utilize the allocated spectrum as efficiently as a cellular system employing a smaller reuse factor. However, the level of co-channel interference received by a receiver in the cellular system is directly dependent on the reuse factor. Reducing the reuse factor while maintaining the same transmit power tends to increase the level of co-channel interference experienced by a receiver. To better utilize the available spectrum, it would be advantageous to be able to suppress the effects of co-channel interference.

To suppress co-channel interference and equalize the received signals, it is in many cases necessary to estimate and track the time-varying frequency response of the propagation channel. Algorithms known in the art that do not adequately track the time-varying frequency response of the received signal will exhibit poor interference suppression performance and poor equalization performance.

Another technique for increasing the utilization of the frequency spectrum in a wireless communication system is to allocate multiple subscriber devices within a cell to the same time-frequency resources at the same time. Such a technique is known in the art as Spatial Division Multiple Access (SDMA). Many algorithms known in the art that are designed to enable SDMA must be capable of tracking the subscriber devices' time-frequency variations that are caused by a time-varying multipath channel. Failure to track these variations will reduce the ability of the receiver to demodulate the signals transmitted by the multiple subscriber devices.

One final problem faced in a communications receiver is the amount of operations (e.g., complex multiplies) that its processors can perform per second. This is especially important in mobile receivers where battery power must be conserved (i.e., as a typical rule, the more computations per second required, the more power must be consumed by the receiver's embedded processors). Even in non-mobile receivers such as base stations, the savings in operations per second can be applied to other operations such as coding or antenna array combining algorithms.

Thus, there is a need for a method and device for estimating the time and frequency response of at least one transmitted signal received on at least one receive antenna. In addition, the method and device for estimating the time and frequency response should also perform the estimation with the fewest operations per second. This invention provides a method for reducing the number of operations per second required by standard channel estimators.

In certain communication applications, there is a need to interpolate between two or more channel estimates. For example, an existing channel estimation can be employed to find the time-domain channel response at three different times. The method and device in this invention then can be used to find the time-domain channel estimates for any time in between the channel estimates found with the existing channel estimation technique.

In other communication applications there may be a need to predict the channel beyond the time or frequency where the existing estimator operates. For example if a communication system has a pilot block followed by data, the method and device in this invention can be used to predict what the channel will be at the data symbols based on the existing channel estimates on the pilot block.

DETAILED DESCRIPTION OF A PREFERRED EMBODIMENT

Figure 1:
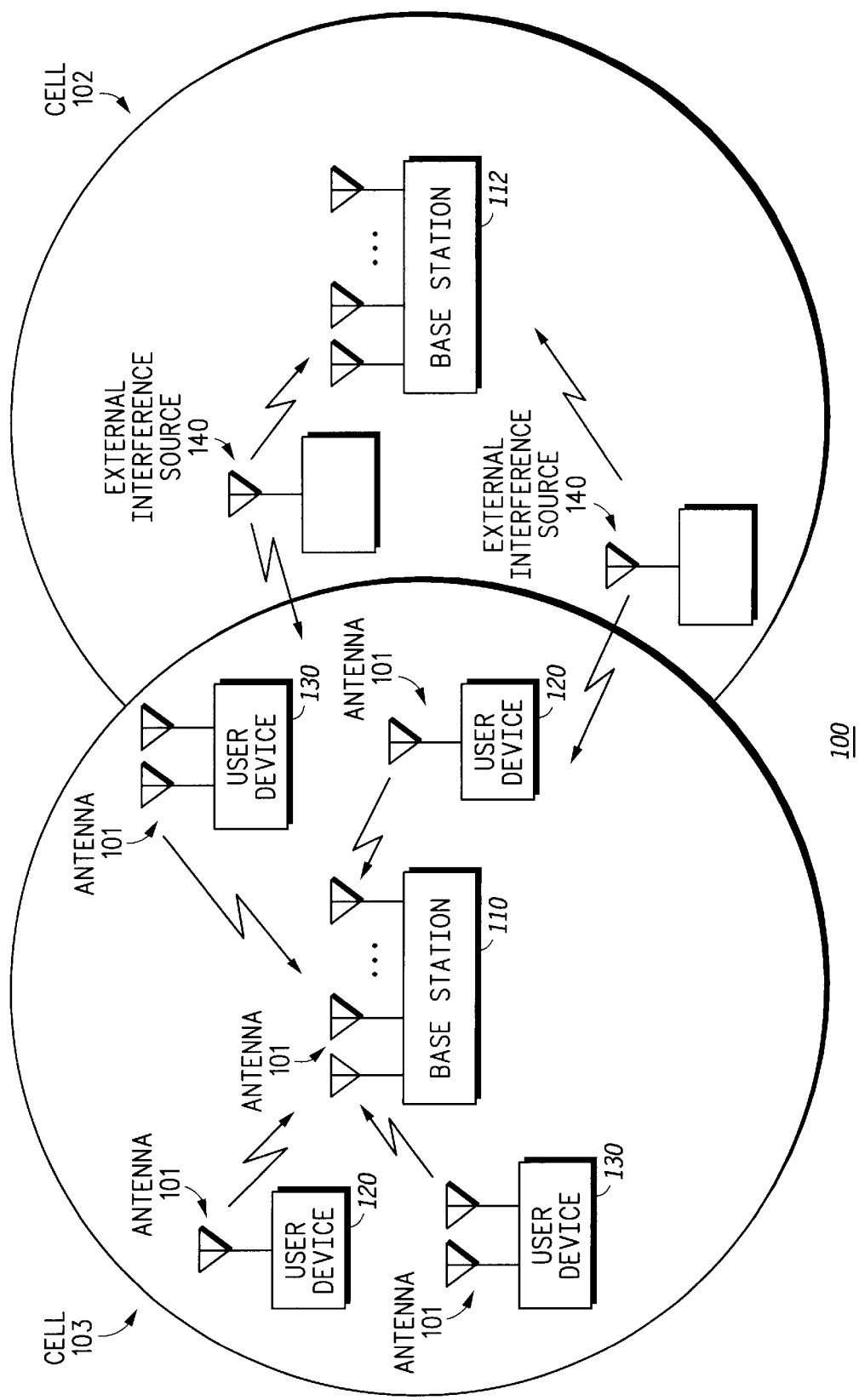
FIG. 1 is an overview diagram of a preferred embodiment of a cellular communication system in accordance with the present invention.

An adaptive antenna array is a group of antennas connected to a communications receiver, and operates by combining the signals received by the antennas in order to optimize the receive characteristics of the array. By weighting and then summing the multiple antenna signals, the adaptive antenna array can modify its angular response, sometimes called the array pattern, in response to changes in the propagation environment. While operating, the adaptive antenna attempts to maximize the reception of the signal received from a desired transmitting device while simultaneously minimizing the effects of all other unwanted interfering signals and noise. In a communication system, the interference suppression capability of an adaptive antenna array offers the potential to reduce co-channel interference, improve coverage quality, and increase overall system capacity.

Adaptive antenna arrays also offer the possibility of providing Spatial Division Multiple Access (SDMA), a new way of multiplexing multiple devices. With SDMA, multiple devices can simultaneously share the same channel in relation to time, frequency, or code. The shared channel is separated and simultaneously decoded by the receiver array based on the transmitting devices spatial position relative to the antenna array. When successfully deployed, SDMA promises to provide enormous increases in system capacity.

Spatial Division Multiple Access is a difficult technology to implement because of the rapidly varying multipath fading channel. In an SDMA system, the devices that are sharing a channel provide interference to the receiver processing algorithms that decode the transmitted signals. When a receiver processing algorithm attempts to decode one SDMA device, other SDMA devices provide strong interference to the decoding algorithm. An adaptive antenna implementing SDMA suppresses the interference of multiple devices while decoding each transmission individually.

An equalizer is a common method and device used to counter the effects of multipath variations. A problem associated with employing both an equalizer and an adaptive antenna in a wireless communication system lies in the design of an algorithm and device having adequate ability to adapt to changes in the signal environment. For optimal performance, adaptive antennas that operate in a fast-fading multipath environment must adapt to the rapidly varying channel as well as to any changes in the nature of the desired and interfering signals. In a broadband system, a frequency selective multipath channel will cause significant variations in the channel across the occupied bandwidth of the received signal. Equalization and interference suppression algorithms that cannot track these channel variations in both time and frequency will suffer significant degradation in performance as measured by the Bit-Error Rate (BER) or Signal-to-Interference-plus-Noise Ratio (SINR).

A common ingredient in many equalizers and adaptive antenna arrays is an algorithm and device that estimates the characteristics of the multipath propagation environment, channel transfer function, or channel frequency response between the desired transmitting device and each of the plurality of receiving antennas at the communication receiver. When SDMA is being employed in a broadband system operating in a frequency selective environment, then an adaptive antenna array generally requires an estimate of the channel frequency response between each receiving antenna and each of the transmitting devices that are simultaneously sending information to the array. The channel estimation algorithm in this case should operate to simultaneously solve for the channel responses of the multiple transmitting devices by performing a simultaneous estimate of the channel responses. This is a difficult operation to perform however in a mobile broadband communication system operating in a multipath-rich environment with high frequency selectivity. Strong interference caused by an SDMA deployment, or a low reuse factor causes even more difficulty to the channel estimation algorithms. It would therefore be advantageous for a device to be able to compute an accurate channel frequency response estimate in the presence of co-channel and SDMA interference. It would also be advantageous for a device to be able to track any variations in the channel frequency response of multiple mobile users whose channel responses will vary as the users move.

Given the need for higher system capacities in wireless communication systems, adaptive antennas and advanced equalization techniques are important for satisfying the ever-increasing need for high data rate communications. To support the operation of adaptive antennas and equalizers, it is advantageous to have a method and device that tracks the time-varying frequency response of a broadband system accurately enough to permit effective equalization and interference suppression. Given the difficulties associated with implementing SDMA, and the deleterious nature of the multipath fading environment, such a device would enable improved equalization and interference suppression performance in a mobile broadband communication system.

Briefly described, the present invention is a method and device for calculating the channel frequency responses of the signals transmitted by at least one transmitting device and received on at least one receive antenna. The method and device of the present invention can be incorporated into a communications receiving device, base station, or subscriber unit. In the present invention, the term "device" can refer to any type of communications device such as a base station, subscriber unit, or other communications receiver or transmitter. Further, the method and device of the present invention can be used by an adaptive antenna combining algorithm for the purposes of jointly equalizing the received signals, while simultaneously suppressing interference in a communication receiver in order to recover the information transmitted by the device(s). In a highly frequency selective mobile propagation channel, the ability to accurately track the variations in the channel response over both time and frequency dimensions is critical to the proper operation of any equalization or interference suppression algorithm. The method and device of the present invention provide an improved technique for estimating the channel frequency response.

The present invention is implemented in a communication system where at least one desired transmitting device transmits information to a communication receiver having at least one antenna. In a preferred embodiment, pluralities of transmitting devices simultaneously transmit information to a communication receiver having a plurality of antennas. A transmitting device transmits its information in bursts that contain a training interval and a data interval. The information transmitted in a training interval contains pilot symbol sequences of content and duration known by both the transmitting device and the communication receiver. The data interval contains data symbols that must be recovered at the receiving device. In the present invention, the term "burst" refers to any one of the following: a short or isolated transmission, a portion of a longer transmission, a portion of a continuous transmission, a portion of a semi-continuous transmission, a time-limited transmission, a bandwidth-limited transmission, or any combination thereof.

In a communication system, the present invention provides an improved technique for computing a channel transfer function (also referred to as "estimating the frequency response," or "computing a set of frequency-domain channel gains") of the propagation channel between each of the at least one transmitting device and the at least one receiving antenna. The frequency response estimates can then be used to equalize the received signals so that a demodulating device at the communication receiver can recover the data symbols transmitted by the transmitting devices. If more than one antenna is present at the communication receiver, then the method and device of the present invention can be used to enable an adaptive antenna to simultaneously receive and recover the information transmitted simultaneously by more than one transmitting device. In addition, the method and device of the present invention can be used to enable an adaptive antenna to suppress the effects of unwanted interference transmitted by other users of the occupied bandwidth.

The ability to receive and recover the information transmitted simultaneously by more than one device significantly increases the capacity of the communication system. Conventional cellular systems permit only one device to transmit on a particular frequency channel within a cell for any predetermined time interval. Providing for more than one device to transmit to a base station on the same frequency channel at the same time will multiply the capacity of the system by a factor equal to the number of devices that are allowed to simultaneously transmit. Devices incorporating algorithms for providing this capability must have the ability to track any variations in the time and frequency selective channel. The method and device of the present invention provide excellent channel response tracking.

One limiting factor to the implementation of a channel estimator in broadband communications is the large number of computations required to find the accurate estimates needed for equalization, or to implement advanced antenna combining techniques. For example, in communication systems such as Orthogonal Frequency Division Multiplexing (OFDM) most existing channel techniques calculate a channel estimate at each OFDM subcarrier at each time block. In typical estimators, the estimation is accomplished at each time block where a channel estimate is desired. The estimation is calculated using a matrix multiplier to multiply a matrix of weighting coefficients by a matrix of the received pilot data. The device and method of the current invention transforms the existing matrix of channel estimation weighting coefficients into a real-time matrix of weighting coefficients of lower dimension which is applied to the received data. The result is fed to a computationally efficient FFT. Consequently, the method and device of this invention requires more computations at device initialization time but greatly reduces the number of computations needed for real-time operation of a communication receiver where the computational savings is most beneficial.

In certain communication receiver applications, there is a need to find the channel response at times, subcarriers, or both where the existing channel estimator does not provide an estimate. In other words, there is a need to either interpolate between existing channel estimates to find channel estimates for times, subcarriers, or both between the existing channel estimates, or to predict the channel response at times, subcarriers, or both beyond where the current channel estimator operates. An example of the need for channel prediction is a communication system that has a pilot block followed by data. The method and device in this invention can be used to predict what the channel will be at the data symbols based on what the existing channel estimator found at the pilot block.

The present invention is implemented in a communication system where an existing channel estimation method or device is already employed, with the benefit of reducing the run-time computational complexity of the existing channel estimation device. The method and device of this invention is used to either interpolate (in time or frequency or both) between the channel estimates found by the existing channel estimation device, or to predict (in time, frequency or both) the channel estimate found by the existing channel estimation device, beyond the time, frequency or both time and frequency where the existing channel estimate is valid.

FIG. 1, numeral 100, illustrates a wireless communication system in accordance with a preferred embodiment of the present invention. A preferred embodiment typically operates in a mobile delay-spread channel under the assumption that the channel can change significantly over the occupied bandwidth and significantly in time. As shown in 100, a Base Station 110 provides communication service to a geographic region known as a cell 103. A plurality of User Devices 120 and 130 communicate with the Base Station 110. In some embodiments of the communication system of 100, a plurality of External Interference Sources 140 share the same spectrum allocated to the base station 110 and subscriber devices 120 and 130. The External Interference Sources 140 represent an unwanted source of emissions that interferes with the communication process between the Base Station 110 and the User Devices 120 and 130. The exact nature of the External Interference Sources 140 will depend on the specific embodiment of the communication system of 100. In some cases, an External Interference Source 140 will be another User Device 120 or 130, which is communicating with another Base Station 112 in the same frequency spectrum allocated to Base Station 110. User Devices 120 have a single antenna, while User Devices 130 have at least one antenna. The method and device of the present invention can be implemented as part of a Base Station 110 as well as part of a User Device 120 or 130.

Figure 2:
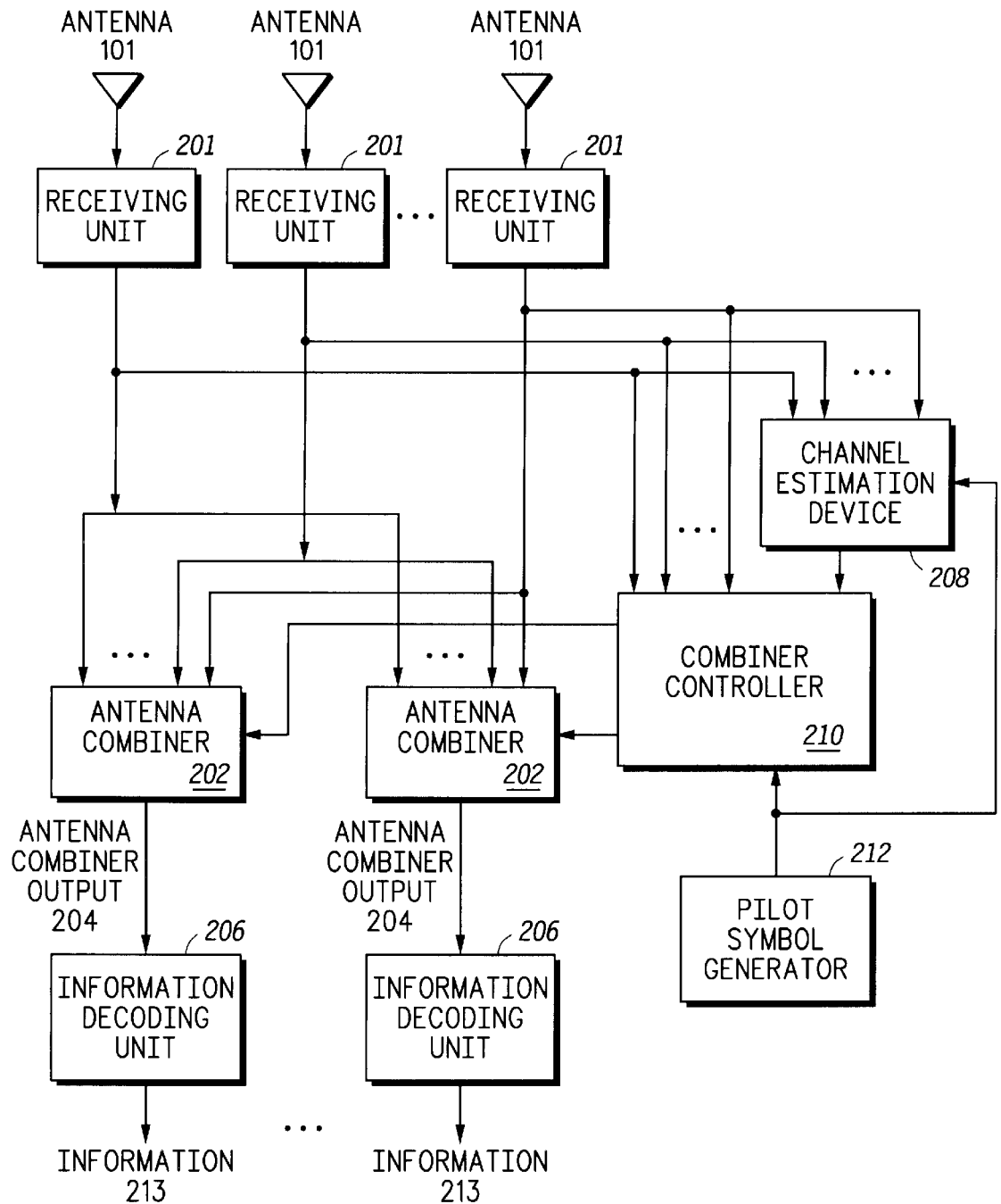
FIG. 2 is a block diagram illustrating a device in accordance with the present invention.

FIG. 2, numeral 200, is a block diagram illustrating a device in accordance with the present invention. In accordance with the present invention, the communication receiver includes at least one antenna 101 wherein the outputs of the antennas are each provided to a receiving unit 201. The outputs of the receiving units 201 are provided to at least one Antenna Combiner 202. The antenna combiner 202 processes multiple signals into one signal. The signals from the receiving units 201 are also fed into the Combiner Controller 210, which regulates the operation of the at least one Antenna Combiner 202. The signals from the receiving units 201 are also fed into the Channel Estimation Device 208. The Pilot Symbol Generator 212 generates pilot symbol information that is used by the Combiner Controller 210 to control the Antenna Combiner 202. The pilot symbol information generated by the Pilot Symbol Generator 212 is also used by the Channel Estimation Device 208 to estimate the time-varying frequency responses of the transmitting devices (120, 130, 110, 112, or 140, or any combination thereof). The output of an Antenna Combiner 202 is fed into an Information Decoding Unit 206, which decodes the Antenna Combiner Output 204 and generates the data information 213 that was received by the Antennas 101.

Figure 3:
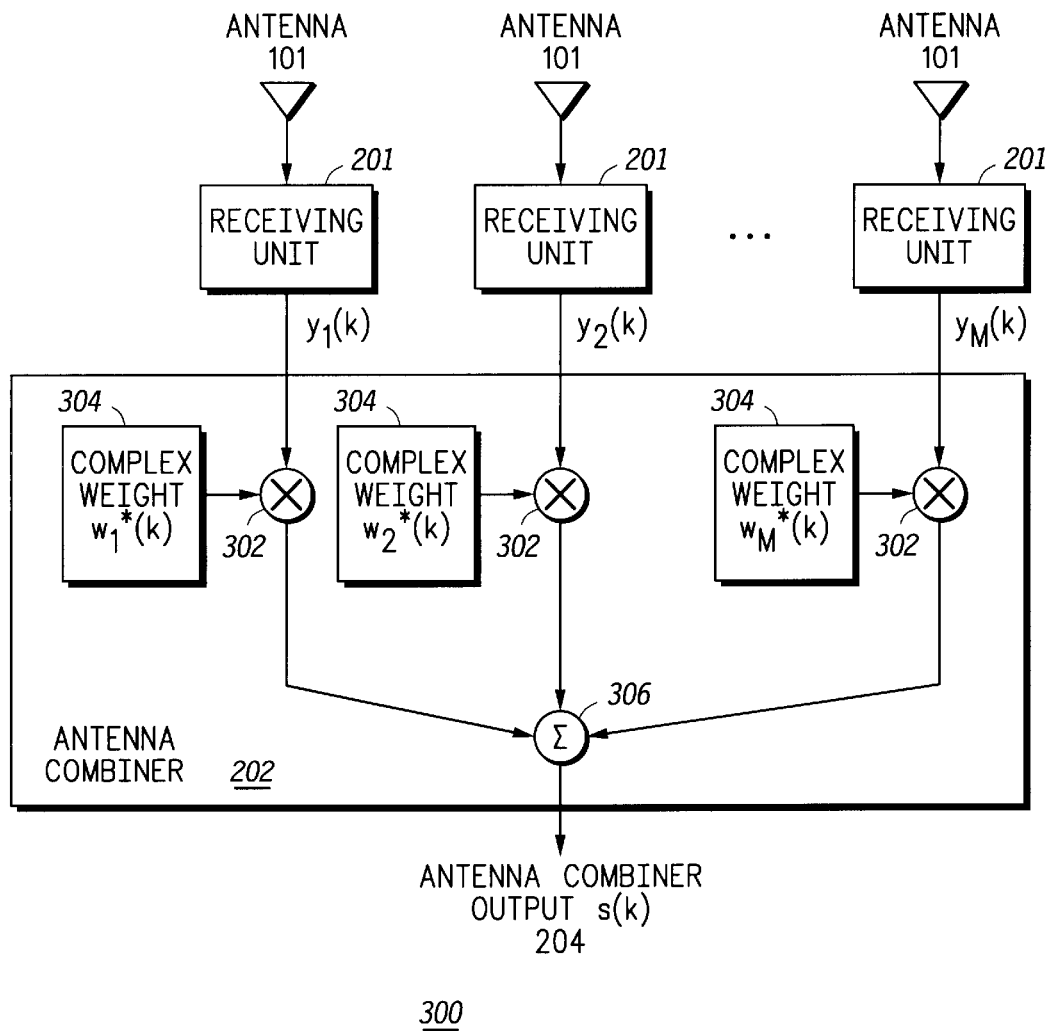
FIG. 3 is a block diagram illustrating details of the Antenna Combiner of the device of FIG. 2.

FIG. 3, numeral 300, is a block diagram illustrating details of the Antenna Combiner of the device of 200. The Antenna Combiner 202 is coupled to the receiving units 201, which in turn are coupled to the antennas 101. In a preferred embodiment, the receiving units 201 may include radio frequency pre-amplifiers, filters, and other devices that can be used to convert the radio frequency signal received by the antenna down to a digital stream of baseband equivalent complex symbols. As shown in 200, the output of the i'th receiving unit 201 (where i is an integer between 1 and M inclusive, and M is the total number of antenna elements) is mathematically denoted by $y_i(k)$, where k and i are integers, and is provided to the antenna combiner 202 which can be in the form of a plurality of complex multipliers 302 which multiply the output of each receiving unit 201 by a complex weight 304, mathematically denoted as $w_i(k)$, and a combiner 306 sums the outputs of the plurality of complex multipliers 302. The values of the complex weights 304 are controlled by the Combiner Controller 210, shown in 200.

Figure 4:
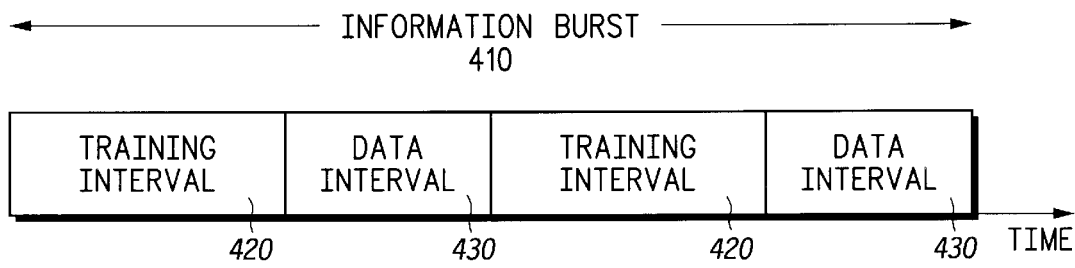
FIG. 4 is a timing diagram illustrating the structure of an Information Burst, which can be used by the communication system in which the device in FIG. 2 operatesd.

FIG. 4, numeral 400, is a timing diagram illustrating the structure of an information burst 410 transmitted between a plurality of transmitting devices (e.g., Base station 110, User Device 120, or 130) and a receiving device (e.g., Base station 110, User Device 120, or 130). An information burst 410 includes at least one training interval 420 and at least one data interval 430. During a training interval 420, a transmitting device transmits training information consisting of at least one pilot symbol of duration, content, and timing known to both the transmitting device and the receiving device. The Channel Estimation Device 208 uses the outputs of the receiving units 201 during at least one of the training intervals 420 and the knowledge of the transmitted sequence of pilot symbols to compute an estimate of the channel time and frequency response between the plurality of transmitting devices and the antennas 101 of the receiving device.

Figure 5:
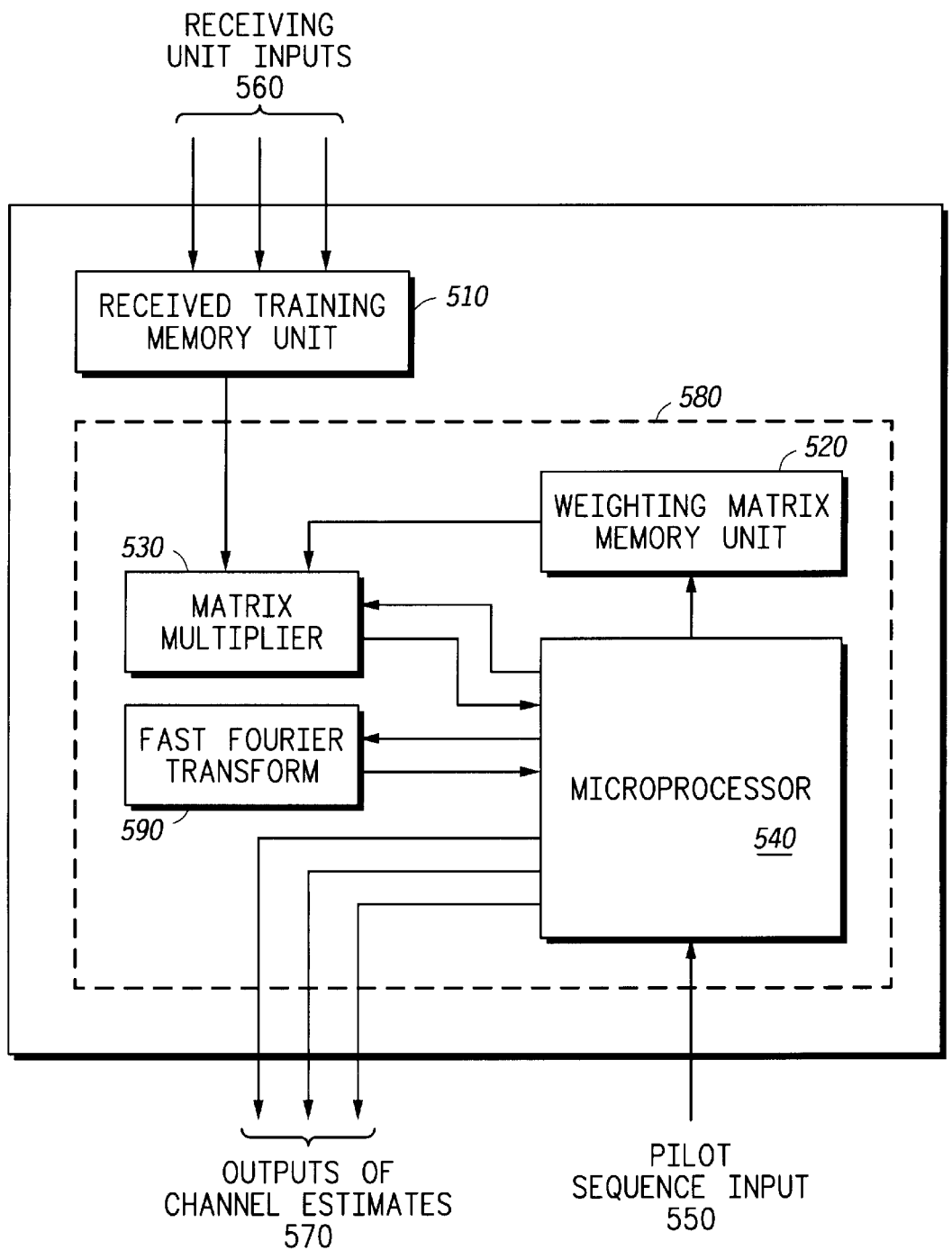
FIG. 5 is a block diagram illustrating details of the Channel Estimation Device of the device of FIG. 2.

FIG. 5, numeral 500, is a block diagram illustrating details of the Channel Estimation Device 208 of device 200. A preferred embodiment of the Channel Estimation Device 208 includes a Received Training Memory unit 510, which stores the output signals from the Receiving Units 201 that were collected during at least one of the training intervals 420. A microprocessor 540 collects the pilot sequence information from the Pilot Sequence Input 550 and computes a weighing matrix to be stored in a Weighting Matrix Memory Unit 520. The process by which the Matrix of Filtering Coefficients is computed by the Microprocessor 540 will be described below. The received data stored in the Received Training Memory Unit 510, and the Matrix of Weighting Coefficients stored in the Weighting Matrix Memory Unit 520 are fed into a Matrix Multiplier 530 where they are multiplied to form the estimates of the channel response between the plurality of transmitting devices and the receiving antennas 101 on the receiver. The Weighting Matrix Memory Unit 520, the Matrix Multiplier 530, and the Microprocessor 540 are implemented in a processor 580. In another embodiment of the present invention, the Microprocessor 540 takes the output of the matrix multiplier and feeds the result to the Fast Fourier Transform Device 590, the output of which is used by the Microprocessor 540 in the process of computing the channel gains between the plurality of transmitting devices.

Figure 6:
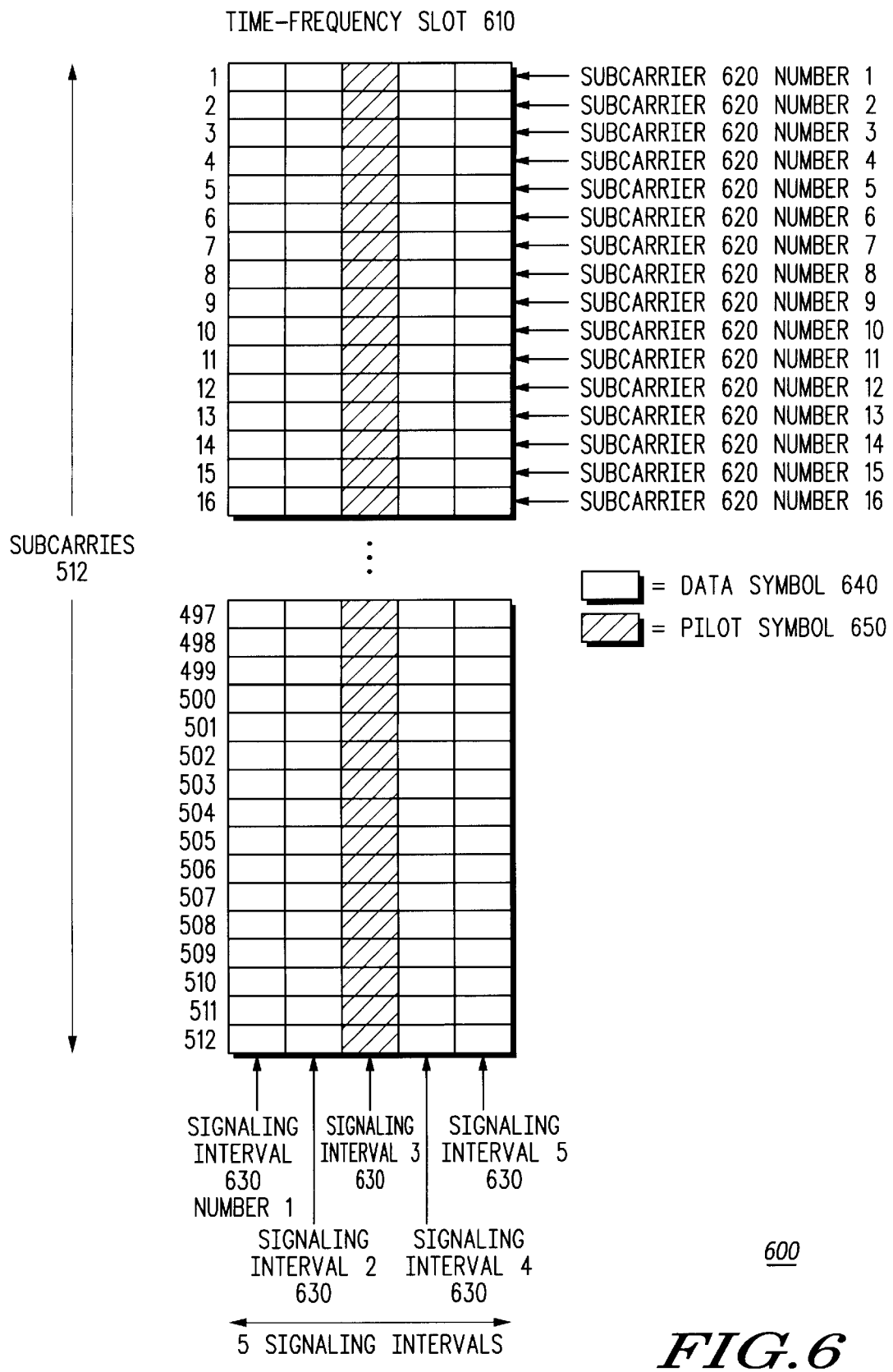
FIG. 6 is a representation of the structure of a time-frequency slot, which can be used by the communication system in which the device in FIG. 2 operates.

In both multicarrier and single carrier systems, an information burst 410 can be referred to as a time-frequency slot. FIG. 6, numeral 600, is a representation of a preferred embodiment of the structure of a time-frequency slot utilized in a communication system in accordance with the present invention. Each time-frequency slot 610 consists of a portion of the time-frequency spectrum over which a particular transmitter transmits its information to the receiver. The signal transmitted in a time-frequency slot occupies a predetermined number of subcarriers 620 (also referred to as "frequency bins") in the frequency domain. These subcarriers 620 are numbered between one and the total number of subcarriers inclusive. The signal transmitted in a time-frequency slot also occupies a predetermined number of signaling intervals 630, numbered between one and the total number of signaling intervals inclusive.

Each information symbol contained in a time-frequency slot 610 is identified with a unique pair of numbers (k, b), where b is between 1 and the number of signaling intervals B inclusive, and k is between 1 and the number of subcarriers K in the time-frequency slot. The time-frequency slot of 600 shows a slot that is 512 subcarriers long in frequency and 5 signaling intervals long in time, for a combined total of 2560 symbols. The demodulation process for one signaling interval 630 within a time-frequency slot 610 produces a plurality of information symbols, where each information symbol is either a Data Symbol 640 or a Pilot Symbol 650, and each information symbol corresponds to one of the subcarriers 620 of the system. The time-frequency slot will consist of either all or a pre-determined subset of the total number of subcarriers 620 received over a pre-determined number of signaling intervals 630. In a multicarrier system or an OFDM system, different transmitters can be assigned to different subcarriers within a particular signaling interval. However, in a single carrier system, a transmitter occupies the entire allocated bandwidth of the system.

In a single carrier system, the information symbols carried on the subcarriers 620 are a frequency-domain representation of the signal transmitted during a signaling interval 630, and can be produced by carrying out a Fast Fourier Transform (or another similar transform) of the time-waveform received during the signaling interval 630. To recover the original transmitted waveform, the information symbols generated on the subcarriers can be transformed back into the time-domain by a Inverse Fast Fourier Transform (IFFT, or another similar transform).

In a multicarrier system, the information carried on the subcarriers are the actual information-bearing symbols that are demodulated to produce the information being transmitted by the transmitting device. Unlike a single carrier system, an IFFT (or similar transform) is not needed to recover the transmitted information.

In the time-frequency slot, the data symbols 640 are used to convey the user information, such as a voice signal or multimedia data traffic, that is being communicated to the receiver. The pilot symbols 650 are symbols known to both the transmitter and the receiver and are used by the receiver to aid in decoding the transmitted data symbols. Other than assisting in reliably maintaining the communication link, pilot symbols generally contain no user information and therefore, represent a portion of the channel capacity that cannot be used for transmitting user information. A pilot symbol, or a group of pilot symbols, can also be referred to as pilot data or as a pilot sequence. The group of pilot symbols within the time-frequency slot is reserved for transmitting sequences of pilot symbols that are known by the receiver.

In a time-frequency slot 610, at least one transmitter is assigned to transmit its data symbols and pilot symbols to the receiver. If more than one transmitter is assigned to transmit to the receiver in a time-frequency slot, then an access technique called Spatial Division Multiple Access (SDMA) is used by the receiver. The present invention allows the communication receiver to estimate simultaneously the channel responses of the signals transmitted by the multiple transmitters sharing the same time-frequency slot.

To aid in the understanding of the operation of the invention, a mathematical description of the preferred embodiment of the present invention is now presented. In the following, an OFDM system is assumed, and the variable M is an integer used to represent the number of antenna outputs used by the present invention. The variable J designates the number of desired transmitting devices who are simultaneously transmitting on a time-frequency slot and whose channel transfer functions are to be estimated. The variable k designates the frequency subcarrier number, and the variable b designates the signaling interval, or OFDM baud.

In the following discussion, the mathematical notation and characteristics of the OFDM system in the preferred embodiment is first discussed. Next, the mathematical details and characteristics of the present invention are described.

The preferred embodiment of the present invention is an OFDM system utilizing the strategy of SDMA. The transmitted waveform of the $j^{th}$ subscriber unit (where j is an integer between 1 and J inclusive) propagates through a multipath channel having a number of discrete multipath paths denoted by the variable $L_p$. The received samples at the $n^{th}$ sampling time instant on each of the M receive antennas are collected into the M×1 received time-domain desired signal vector y(n). Neglecting the receiver noise on the antenna elements, y(n) is given by:

$$y(n) = \sum_{j=1}^{J} \sum_{l=1}^{L_P} \gamma_{lj} \alpha_{lj}(n) a_{lj} x_j(n - \delta_{lj}) \qquad (1)$$

where, $\gamma_{lj}$ is a variable that denotes the complex gain of the $l^{th}$ multipath ray (where l is between 1 and $L_p$ inclusive) for the $j^{th}$ user and has an exponential power delay profile in a typical mobile channel, as is known in the art. Also, the variable $\alpha_{lj}(n)$ is the complex fading gain for ray l, user j, at time sample n and is Rayleigh-faded as is known in the art. The variable $x_j(n)$ is the sampled transmitted time-domain waveform of user j at time sample n. The variable $\delta_{lj}$ is the delay time of path l of user j, and these delay times ($\delta_{lj} \in \{0,1, \ldots, \delta_{max}\}$) are uniformly distributed between zero differential delay and some maximum delay value in a typical mobile channel. The vector $a_{lj}$ is the M×1 array manifold vector (as is known in the art of adaptive antennas) of the multipath ray l of user j, and is assumed to be constant over a simulated burst of symbols. The vector $a_{lj}$ captures the gain and phase response of the multipath ray l of user j as received by the antenna array.

As described above, the J desired users transmit in a time-frequency slot consisting of B time blocks and K subcarriers (or frequency bins) in the frequency domain. A time block consists of the N samples (where N is the DFT size of the OFDM system) of the OFDM symbol interval plus the OFDM cyclic prefix. In a typical OFDM system, the cyclic prefix is designed to be at least as long as the duration of the time-domain channel.

Once y(n) is received, the appropriate N (where N is the DFT size of the OFDM system) samples are extracted from each of the symbol intervals (also known as signaling intervals) within the transmitted burst. At each of the M receive antennas, an N-point FFT is then performed on the N samples collected from each of the B time blocks in the burst to compute Y(k,b), the M×1 vector of the frequency-domain received waveform at the $k^{th}$ subcarrier and $b^{th}$ time block across all M antennas. Ignoring all interference other than the self-interference that is caused by the J SDMA users, the received waveform vector can be written as:

$$Y(k, b) = \sum_{j=1}^{J} H_j(k, b) x_j(k, b) + n(k, b) \quad (2)$$

In this equation, $H_j(k,b)$ is an M×1 vector of the sampled Fourier Transform of the real RF multipath channel for the $j^{th}$ user at signaling interval b {b=1 . . . B}, subcarrier k {k=1 . . . K}. $x_j(k,b)$ is the frequency-domain symbol transmitted by user j on subcarrier k of time block b. Also, n(k,b) is a vector of the additive noise samples on the $k^{th}$ subcarrier and the $b^{th}$ time block. The components of the vector $H_j(k,b)$ are also called the channel gains between the $j^{th}$ user and each of the M×1 antennas at the $k^{th}$ subcarrier of the $b^{th}$ signaling interval.

To enable coherent demodulation and training-based adaptive array combining techniques, the SDMA users transmit known pilot symbols at a pre-arranged collection of P frequency-domain symbols within the K by B time-frequency slot. Each of the J SDMA users has a unique length P pilot sequence to enable the receive array to jointly estimate the time-frequency channel responses of the J SDMA users. The J SDMA users transmit D unknown data symbols at the remaining D=KB-P symbol locations within the time-frequency slot.

In the remainder of the discussion, the following notation is used to aid in the understanding of the operation of the invention: Let $t_p$ and $f_p$ denote the time coordinate and the frequency coordinate respectively of the $p^{th}$ pilot symbol (p=1 . . . P) within the time-frequency slot of interest. Also, let $b_d$ and $k_d$ denote the time coordinate and the frequency coordinate respectively of the $d^{th}$ data symbol (d=1 . . . D) within the time-frequency slot of interest.

In the OFDM system of a preferred embodiment, the goal of the channel estimator is to produce an M by 1 estimate for the vector $\hat{H}_j(k_d,b_d)$ of the channel gains of each of the j=1 . . . J users at each of the D data symbols within the time-frequency slot (where the $d^{th}$ data symbol has time-frequency coordinates $b_d$ and $k_d$, respectively). The D data symbols can contain the location of one or more of the pilot symbols if the communication receiver needs a channel estimate at those pilot symbols in addition to the data symbols. The invention computes an estimate of the set of channel gains $\hat{H}_j(k_d,b_d)$ according to the following equation:

$$\tilde{H}_j(k_d, b_d) = \sum_{p=1}^{P} Y(f_p, t_p) q_j(d, f_p, t_p) \quad (3)$$

This equation is simply a weighted sum of the received data vectors at the P pilot symbols within the time-frequency slot. According to this equation, to estimate the $j^{th}$ user's channel response at the $d^{th}$ data symbol (located at $k_d$, $b_d$ within the time-frequency slot), the received data vectors at the P pilot symbols are weighted by the set of coefficients $q_j(d,f_p,t_p)$ (called the set of primary weighting coefficients) and then summed. In matrix form, we have:

$$\hat{H}_j(k_d,b_d) = Y q_j(d), d=1 \ldots D \quad (4)$$

where Y is the M by P matrix containing the received data samples on the M antennas at the P pilot symbols:

$$Y=[Y(f_1,t_1)\ Y(f_2,t_2) \ldots Y(f_P,t_P)], \quad (5)$$

and $q_j(d)$ is a P by 1 vector of primary weighting coefficients (also known as the set of primary weighting coefficients) used to produce the channel estimate of the $j^{th}$ user at the $d^{th}$ data symbol:

$$q_j(d) = [q_j(d, f_1, t_1)\ q_j(d, f_2, t_2) \ldots q_j(d, f_P, t_P)]^T \quad (6)$$

To compute an estimate of the set of channel gains $\hat{H}_j(k_d,b_d)$, the invention establishes a set of analytic channel gains that act as a variable to hold the value of the true channel gains. The invention then computes a simulated error signal between the set of estimated channel gains, that have the form of Equations (3) and (4) above, and the set of analytic channel gains. The set of estimated channel gains is then mathematically expressed as a function of the pilot sequences of all of the transmitting devices, the primary set of weighting coefficients, and the set of analytic (or true) channel gains. The invention then solves for the set of primary weighting coefficients that will minimize the expected value of the square of the error signal. The values of the primary weighting coefficients are determined mathematically to be a function of the statistics of the true (or analytic) channel gains.

In mathematical terms, an embodiment of the invention is described as follows. At each data symbol d and for each of the J SDMA users, the vector (or set) of primary weighting coefficients $q_j(d)$ must be estimated to minimize the mean square error between the estimated channel response and the true (or analytic) channel response:

$$MSE(j, d) = E\left[\left|H_j(k_d, d_d) - \tilde{H}_j(k_d, b_d)\right|^2\right] \quad (7)$$

This equation shows the mean square error of a simulated error signal that is computed to be the error between the analytic channel gains and the estimated channel gains. The simulated error signal is given by $H_j(k_d,b_d) - \hat{H}_j(k_d,b_d)$. First, we can express the M by P data matrix Y as follows:

$$Y = \sum_{j=1}^{J} [H_j diag(s_j)] + N \quad (8)$$

where $H_j$ is a M by P matrix of analytic channel gains (which act as variables to hold the values of the true channel gains) for the $j^{th}$ user at the M antennas and the P pilot symbols:

$$H_j = [H_j(k_1, b_1)\ H_j(k_2, b_2) \ldots H_j(k_P, b_P)], \quad (9)$$

In Equation (8), N is the M by P matrix of noise samples on the M antennas at the P pilot symbols; $s_j$ is a P by 1 vector of pilot symbols for the $j^{th}$ SDMA user, and the diag(x) operator produces a square matrix having all zeros except for the main diagonal, which contains the vector argument. By making use of Equation (8), the estimate for the channel gains as expressed in Equation (4) can now be written as $$\hat{H}_j(k_d, b_d) = \left[\sum_{j=1}^{J} [H_j diag(s_j)] + N\right] q_j(d), \quad d = 1 \ldots D \quad (10)$$

This equation basically states that the set of estimated channel gains is a function of the set of analytic channel gains, the known pilot sequences transmitted by the J transmitting devices, the primary weighting coefficients, and the noise signals received on the receiving antennas.

After making use of Equation (10), Equation (7) can be written as:

$$MSE(j, d) = E\left\|H_j(k_d, b_d) - \left(\sum_{j=1}^{J} [H_j diag(s_j)] + N\right) q_j(d)\right\|^2 \quad (11)$$

This equation states that the mean square error is a function of the analytic channel gains (also known as the true channel gains), the pilot sequences, the received noise samples, and the primary weighting coefficients. At this point, the problem can be equivalently expressed as the following minimization problem:

$$\min_{\substack{q_j(d) \\ j=1 \ldots J \\ d=1 \ldots D}} E\left\|H_j(k_d, b_d) - \left(\sum_{j=1}^{J} [H_j diag(s_j)] + N\right) q_j(d)\right\|^2 \quad (12)$$

Given Equation (11), Equation (12) states that the set of primary weighting coefficients $q_j(d)$ is computed to minimize the mean square error for the simulated error signal.

The value of $q_j(d)$ that minimizes Equation (11) can be shown to be:

$$q_j(d) = \Psi^{-1} \alpha_j(d) \quad (13)$$

and the MMSE channel estimator is then given by $$\hat{H}_j(k_d, b_d) = Y\Psi^{-1} \alpha_j(d) \quad (14)$$

where $$\alpha_j(d) = diag(s^*_j) E\{H_j^H H_j(k_d, b_d)\} \quad (15)$$

and $$\Psi = \sum_{n=1}^{J} [diag(s^*_n) E\{H_n^H H_n\} diag(s_n)] + MR_{nn} \quad (16)$$

In an embodiment of the present invention, Equation (13), the set of primary weighting coefficients, will be computed when the receiver is initialized before the receiver receives any information bursts.

In the above equations, $E\{H_j^H H_j(k_d, b_d)\}$ is a P by 1 vector whose $i^{th}$ element is the correlation between the channel gain at the $i^{th}$ pilot symbol (located at subcarrier $f_i$ and baud $t_i$) and the channel at the $d^{th}$ data symbol (located at subcarrier $k_d$ and time $b_d$). Also, $E\{H_j^H H_j\}$ is a P×P matrix whose $(i,j)^{th}$ element is the correlation between the channel at the $i^{th}$ pilot symbol (located at subcarrier $f_i$ and baud $t_i$) and the channel at the $j^{th}$ pilot symbol (located at subcarrier $f_j$ and baud $t_j$). Furthermore, $R_{nn}$ is the P×P noise correlation matrix, which in a preferred embodiment is equal to $\sigma^2 I_p$, where $\sigma^2$ is the noise power on a receive antenna element. It can be shown that:

$$E\{H_j^H(k+f, b+n) H_j(k, b)\} = Mr_F(f) r_T(n) \quad (17)$$

where $r_F(f)$ is the channel correlation across frequency, which is determined by the nature of the delay-spread profile of the propagation channel. Also, $r_T(n)$ is the channel correlation across time, which is determined by the Doppler profile of the propagation channel. If an estimate of the channel gain is required at a point within the information burst occupied by a pilot symbol, then the above analysis is valid provided the correlation functions properly reflect the correlation between the point where the channel gain is required and all the pilot symbol locations within the burst.

The above analysis, as expressed in equations (8) and (9), is establishing a mathematical expression of the true channel gains (the matrix $H_j$ and its components therein), which are called the "analytic channel gains." The above analysis also establishes, through equations (3) and (4), an estimate of the channel gains, called the "estimated channel gains," which is mathematically expressed in terms of the analytic channel gains, the set of primary weighting coefficients $q_j(d)$, and the pilot sequences through equations (10). The above analysis implicitly establishes through equation (7), an error signal between the estimated channel gains and the analytic channel gains, which is equal to $H_j(k_d, b_d) - \hat{H}_j(k_d, b_d)$. This error signal is a function of the primary weighting coefficients, the pilot sequences, and the analytic channel gains as shown by using Equation (10) in Equation (7). The analysis then solves for the primary weighting coefficients to minimize the power of the error signal, or equivalently, to minimize the mean square error, as shown in Equations (11) and (12). An estimate for the channel gains is then found by multiplying the matrix containing the data received at the pilot symbols by the primary weighting coefficients as shown in Equations (3), (4), (13), and (14).

The performance of this MMSE channel estimator is therefore related to the choice of both time and frequency channel correlation functions in the equations for the estimated channel gains. First the choice of the frequency correlation function, $r_F(f)$, will be discussed. Afterwards, the choice of the time correlation function, $r_T(n)$, will be discussed. One possible choice for the frequency correlation function is a sampled flat delay spread profile with some maximum number of time-domain samples, L, where L is an integer. The complex conjugate of the associated frequency-domain correlation function is the K point DFT of a square window of amplitude 1/L and length L. In equation form this is given as (for f=0 . . . K−1):

$$r_F(f) = \left(\frac{1}{L}\right) e^{j\pi(L-1)f/K} \frac{\sin\pi fL/K}{\sin\pi f/K} \quad (18)$$

The drawback of this correlation function is that it assumes that the channel gains at the subcarriers around k=1 are highly correlated with the channel gains at the subcarriers around k=K, which is not true in OFDM when the multipath arrival times of the channel do not line up with the received sample times or if K<N. The use of this correlation function in Equation (17) thus will increase the channel estimation error at the subcarriers around k=1 and k=K. These channel estimation errors will cause a floor in the BER of whatever interference suppression or equalization algorithm that uses these channel estimates. There are two ways to remedy this problem. The first is to make the complex conjugate of the correlation function be the N (where N is an integer >K) point DFT of a square window of amplitude 1/L and length L. This function has the following form (for f=0 . . . K−1):

$$r_F(f) = \left(\frac{1}{L}\right) e^{j\pi(L-1)f/N} \frac{\sin \pi f L/N}{\sin \pi f/N} \quad (19)$$

This correlation function provides a buffer between the channel at subcarriers around k=1 and the channel at subcarriers around k=K so that the channel at one edge is assumed to not be significantly correlated with the other edge. The MMSE channel estimator using this frequency correlation function performs much better than the one in Equation (18) at the edge frequencies.

One other choice for the frequency correlation function is to use a sampled continuous frequency correlation based on the Fourier Transform of a square delay profile in the continuous time-domain. This function provides a more realistic correlation between the edge subcarriers at k=1 and k=K. This correlation function is given as (f=0 . . . K−1):

$$r_F(f) = e^{j\pi L f/N} \frac{\sin(\pi L \tau_{max} BWf/(K-1))}{\pi L \tau_{max} BWf/(K-1)} \quad (20)$$

where BW is the bandwidth of the K subcarriers and $\tau_{max}$ is the maximum expected multipath delay.

For the time correlation, $r_T(n)$, one choice is to assume a Jake's Doppler profile as is known in the art. An alternative is to choose a flat Doppler spectrum whose correlation function is given by (n=0 . . . B−1):

$$r_T(n) = \frac{\sin(2\pi f_d n \Delta T)}{2\pi f_d n \Delta T} \quad (21)$$

where $f_d$ is the expected maximum Doppler frequency, and $\Delta T$ is the time duration of a signaling interval.

To compute the channel estimate given in Equation (14), a M×P complex matrix multiplied by a P×D complex matrix is required per SDMA user every time the channel estimate is required. This represents a large number of computations that can be dramatically reduced if the derivation leading to Equation (14) is modified so that a reduced-set of time-domain channel estimates are found first instead of a larger set of frequency-domain channel estimates. Efficient FFT processing is then used to transform the reduced set of time-domain channel estimates into the larger set of frequency-domain channel gains, which are what the channel estimation device is responsible for computing. An additional set of steps is required to make this modification work, but these additional set of steps will be executed when the device is initialized, before it receives any information bursts. While the device operates, a set of steps are executed that require fewer computations during normal receiver operation than if Equation (14) was used directly to compute the channel gains. The net effect of this modification is to compute a portion of the required computations up front before the device receives any data. The number of computations required while the device operates to receive data will be much less than originally required in Equation (14).

While the device operates, it will leverage the computations carried out upon initialization to compute a reduced-order set of time-domain channel estimates followed by an FFT. That will convert the reduced-order set of time-domain channel estimates into the frequency-domain channel estimates that are the desired channel estimates. A set of time-domain channel gains are estimated in real time, the number of which is much less than the desired number of frequency-domain channel gains to be estimated. Then to estimate the desired frequency-domain channel gains, an efficient FFT is performed on the reduced-set of time-domain channel gains.

The time domain channel estimates are found by modeling the frequency-domain channel estimate as the DFT of L equally-spaced time-domain channel taps as follows:

$$\hat{H}_j(k,b) = \sum_{n=0}^{L-1} h_j(n,b) e^{-j2\pi kn/N} \quad (22)$$

In this equation, $\hat{H}_j(k,b)$ is a set of auxiliary frequency-domain channel estimates, $h_j(n,b)$ is a set of time-domain channel gains, and $e^{-j2\pi kn/N}$ are a set of time-to-frequency weighting coefficients. The number in the set of all $h_j(n,b)$ must be less than the number in the set of all $\hat{H}_j(k,b)$ in order for significant computational savings to be realized. The purpose of this equation is to show the relationship between channel gains in the time-domain and channel gains in the frequency domain.

In the above, N is an integer chosen to be larger than K (the total number of subcarriers) because in OFDM, the frequency-domain channel at subcarrier k=1 will not equal the channel at k=K+1. Note that an implication of Equation (22) is that the time-domain channel taps need to be found at every baud where there is at least one data symbol. Also, note that the set of time domain taps can be easily generalized to arbitrary index instead of being indexed from time 0 to L−1.

In deriving an expression for M×1 $h_j(n,b)$, the following analysis looks only at a single antenna, m, and solves the following minimization:

$$\min_{h_{j,m}(b)} |H_{j,m}(b) - G h_{j,m}(b)|^2 \quad (23)$$

$$h_{j,m}(b) = \begin{bmatrix} h_{j,m}(0,b) \\ \vdots \\ h_{j,m}(L-1,b) \end{bmatrix}, H_{j,m}(b) = \begin{bmatrix} \hat{H}_{j,m}(1,b) \\ \vdots \\ \hat{H}_{j,m}(K,b) \end{bmatrix} \quad (24)$$

$$G = \begin{bmatrix} f^H(0) \\ \vdots \\ f^H(K-1) \end{bmatrix}, f(k) = \begin{bmatrix} 1 \\ e^{j2\pi k/N} \\ \vdots \\ e^{j2\pi k(L-1)/N} \end{bmatrix} \quad (25)$$

The least squares solution to equation (23) is:

$$h_{j,m}(b) = (G^H G)^{-1} G^H H_{j,m}(b) \quad (26)$$

and relates the set of time-domain channel gains to the (much larger) set of auxiliary frequency-domain channel gains. This relationship is needed to show how a much smaller set of time-domain channel gains can be estimated rather than requiring a much larger set of frequency-domain channel gains to be estimated directly. Once the smaller set of time-domain channel gains are estimated, Equation (22) or equivalent efficient FFT processing can compute the desired frequency-domain channel gains.

In Equation (26), $$h_{j,m}(b) = \begin{bmatrix} h_{j,m}(0,b) \\ \vdots \\ h_{j,m}(L-1,b) \end{bmatrix}$$

is the set of time-domain channel gains, and $$H_{j,m}(b) = \begin{bmatrix} \hat{H}_{j,m}(1,b) \\ \vdots \\ \hat{H}_{j,m}(K,b) \end{bmatrix}$$

is the set of auxiliary frequency domain channel gains, and $(G^H G)^{-1} G^H$ is called the set of frequency-to-reduced-time weighting coefficients because it relates a set of frequency-domain parameters to a smaller set of time-domain parameters in a manner that is optimal in a least-squares sense.

Therefore, $h_j(0,b)$ through $h_j(L-1,b)$ are given as:

$$\tilde{h}_j(b) = Y\Psi^{-1} A_j(b) G^* (G^T G^*)^{-1} = Y Q_j(b) \quad (27)$$

where $\tilde{h}_j(b) = [h_j(0,b) | \ldots | h_j(L-1,b)]$, $Q_j(b) = \Psi^{-1} A_j(b) G^* (G^T G^*)^{-1}$, and $$A_j(b) = [\alpha_j(1,b) | \ldots \alpha_j(K,b)] \quad (28)$$

with $\alpha_j(k,b) = \text{diag}(s^*_j) E\{H_j^H H_j(k,b)\} \quad (29)$

While the device receives data over an information burst, Equation (27) is solved, and then an FFT is performed on each of the rows of the M by L matrix $\tilde{h}_j(b)$ to produce a frequency-domain channel estimate for each of the subcarriers of the $b^{th}$ signaling interval on each of the M antennas. In Equation (27), the matrix $Q_j(b)$ is called the matrix of real-time weighting coefficients, because while the device is operating to receive data over the information bursts, $Q_j(b)$ is multiplied by the matrix Y of data received at the pilot symbols to obtain a set of time-domain channel gains that are fewer in number than the number of frequency-domain channel gains originally desired by the channel estimation device. The number of computations required by Equation (27) combined with the computations required by the FFT is much less than the number of computations required by Equation (14), which is directly computing the set of frequency-domain channel gains, whose number is much larger than the number of time-domain channel gains computed in Equation (27).

Thus the computation of the time-parameterized MMSE estimator requires (at each signaling interval where there is at least one data symbol) J complex matrix-matrix multiplies of size M×P (Y) by P×L ($Q_j(b)$) and JM N point FFTs. In order to compare the time parameterized MMSE estimator with the MMSE formulation in equation (14), the following system parameters for an OFDM system include {the number of SDMA users J, equals 3; the number of antennas M, equals 8; the number of bauds in a slot B, equals 11 with the first, sixth and eleventh baud being all pilot symbols (P=1350, D=3600). Additionally, the FFT size of N=512, K=450, and L=57 are assumed.} Then the number of complex multiplies required by the time-parameterized MMSE estimator is given by $$J(B-3)M(PL + (N/2)\log_2(N)) = 15{,}216{,}768 \quad (30)$$

compared to the regular MMSE formulation of Equation (14) which requires J(B-3)MPD=933,120,000 complex multiples. Thus, the time-parameterized version has 61.3 times fewer complex multiples with virtually the same performance.

The computational complexity required while the device operates can be even further reduced by carrying the above analysis one step further. The idea builds on the steps established above and is as follows: Instead of estimating the set of time-domain channel gains, a smaller set of Doppler channel gains are estimated first. Then either an IFFT or a similar type of weighting is performed on the set of Doppler channel gains to estimate the time-domain channel gains at each time point in which the desired frequency-domain channel gains must be calculated. At each time point in which the desired frequency-domain channel gains are to be calculated, an FFT is performed on the time-domain channel gains to obtain the desired frequency-domain channel responses. This procedure provides the ability to efficiently calculate the frequency-domain channel gains over many time points within the information burst.

This additional complexity reduction is accomplished by first parameterizing each time-domain tap (that is, the time-domain channel gains derived in the above analysis) corresponding to a single lag value (which is represented in the above analysis by the entries in $h_j(n,b)$, the time-domain channel gains) by the IDFT of a small number of frequency-domain taps, called Doppler channel gains. This is done akin to the above parameterization by parameterizing the time-varying $h_{j,m}(n,b)$ of user j on antenna m by $V_T = (2V+1)$ time-invariant "Doppler" channels, $g_{j,m,v}(n)$ ($v=-V, \ldots, +V$) as given in the following equation:

$$h_{j,m}(n,b) = \sum_{v=-V}^{+V} g_{j,m,v}(n) e^{i2\pi v b / N_k} = c^H(b) g_{j,m}(n) \quad (31)$$

where c(b) and $g_{j,m}(n)$ are $V_T \times 1$ vectors defined as:

$$c(b) = \begin{bmatrix} e^{i2\pi V b / N_k} \\ \vdots \\ e^{-i2\pi V b / N_k} \end{bmatrix}, g_{j,m}(n) = \begin{bmatrix} g_{j,m,-V}(n) \\ \vdots \\ g_{j,m,+V}(n) \end{bmatrix} \quad (32)$$

The vector c(b) contains a set of "Doppler weighting coefficients" and $g_{j,m}(n)$ contains a set of "Doppler Channel gains."

The "Doppler" channels are found by solving the following equation in the least squares sense.

$$\min_{g_{j,m}(n)} |C g_{j,m}(n) - h_{j,m}(n)|^2 \quad (33)$$

where C (B×$B_T$) and $h_j(n)$ (B×1) are:

$$C = \begin{bmatrix} c^H(1) \\ \vdots \\ c^H(B) \end{bmatrix}, h_{j,m}(n) = \begin{bmatrix} h_{j,m}(n,1) \\ \vdots \\ h_{j,m}(n,B) \end{bmatrix} \quad (34)$$

The solution to Equation (35) is:

$$g_{j,m}(n) = (C^H C)^{-1} C^H h_{j,m}(n) \quad (35)$$

In this analysis, the matrix $(C^H C)^{-1} C^H$ is called a set of "reduced-time-to-reduced frequency weighting coefficients"

because it converts a lower order set of time-domain channel gains to another lower order set of Doppler or frequency-domain channel gains. Also, $h_{j,m}(n)$ is a set of auxiliary time-domain channel gains and $g_{j,m}(n)$ is a set of Doppler channel gains, and the point of this analysis is to show how the auxiliary time-domain channel gains and the Doppler channel gains relates to the other in a fashion that is optimal in a least-squares sense.

The goal is to find the "Doppler" channel gains, $g_{j,m,\nu}(n)$, directly from the frequency-domain pilots through a matrix-matrix multiply. In equation form this is expressed as:

$$[g_{j,-\nu}(l) \ldots g_{j,+\nu}(l)] = YZ_{j,l} \qquad (36)$$

where:

$$g_{j,\nu}(l) = \begin{bmatrix} g_{j,1,\nu}(l) \\ \vdots \\ g_{j,M,\nu}(l) \end{bmatrix}, Z_{j,l} = \tilde{Q}_{j,l} C^*(C^T C^*)^{-1},$$

$\tilde{Q}_{j,l} = [\{Q_j(l)\}_l \ldots |\{Q_j(B)\}_l]$, and $\{A\}_l$ means the $l^{th}$ column of matrix $A$.

In this equation, $Z_{j,l}$ is a real-time weighting matrix because it multiplies the data received at the pilot symbols in real time while the device operates. In a receiver incorporating an embodiment of this invention, $Z_{j,i}$ is computed ahead of time upon initialization before the receiver receives any data on any information bursts.

When Equation (36) is solved, an efficient IFFT may be used to implement Equation (31) to produce the values of each time-tap of the time-domain channel estimate (Equation (27) above) as a function of the signaling interval. Then the channel gain on each subcarrier of each signaling interval is then found using an efficient FFT to implement Equation (22) on each signaling interval.

The above steps reduce the number of computations required while the device is operating, receiving data over an information burst, and computing the frequency-domain channel gains at several time locations within the time-frequency burst. This complexity-reducing step requires a set of computations to be carried out upon device initialization. Then, while the receiver is operating, the receiver estimates the Doppler channel gains according to Equation (36), and then an IFFT and an FFT is performed which will provide the desired frequency-domain channel gains at all desired time-points within the information burst.

The computational complexity for the Doppler channel parameterized MMSE channel estimator in number of complex multiplies is (for the above example with V=1, $V_T$=3):

$$JV_T M(PL + (N/2)\log_2(N)) = 5,706,288$$

This has 163.5 times fewer complex multiples than the frequency-domain MMSE and 2.67 times fewer complex multiples than the time parameterized MMSE with nearly identical performance.

The aforementioned method for reducing the complexity of the channel estimation technique can be applied to any estimation technique that estimates a set of frequency-domain parameters. The general idea behind this complexity-reducing method is to parameterize the frequency-domain parameters as a function of a smaller number of time-domain parameters, which are related to the frequency-domain parameters by an inverse FFT. The matrix, $(G^H G)^{-1} G^H$, would be applied to the matrix applied to the received training data in the arbitrary estimation technique. In addition, the "Doppler" channel method for reducing the complexity of the channel estimation technique can be applied to any estimation technique that estimates a set of time-domain or frequency-domain parameters. The matrix, $(C^H C)^{-1} C^H$, would be applied to the matrix applied to the received training data in the arbitrary estimation technique.

The reduced complexity channel estimation procedure is applied to an existing channel estimator in three embodiments. The first embodiment parameterizes the existing frequency-domain channel estimate by a number, L of time taps. The second embodiment parameterizes the existing channel taps at B time blocks (either frequency domain or time domain) as a small number, $V_T$, of Doppler gains. The third embodiment parameterizes the existing frequency-domain channel estimates of on K subcarriers and B time blocks as a small number ($V_T L$) of time-domain Doppler gains.

For the first embodiment of the reduced complexity channel estimator, we assume that the existing channel estimator for user j on subcarrier k at time block b can be expressed in the following form:

$$\hat{H}_j(k,b) = YE_j(k,b) \qquad (37)$$

where $\hat{H}_j(k,b)$ is a M×1 vector of the auxiliary frequency-domain channel gains for user j at subcarrier k and time block b, Y is the M×P matrix of received pilot data, and $E_j(k,b)$ is a primary weighting matrix of the existing channel estimator. The present invention finds a P×L matrix (referred to as the frequency to reduced time weighting coefficients), $Q_j(b)$, that is a function of the primary weighing coefficients, that when multiplied by the received pilot data will give a set of time-domain channel gains that completely parameterize the frequency-domain channel on time block b. The set of time-domain channel gains are then FFT'd (or similarly transformed) into the frequency-domain to get the set of frequency-domain channel estimates. Due to the smaller dimension of $Q_j(b)$, the fact that $Q_j(b)$ is computed at device initialization, and efficient FFT processing, a large computational savings is achieved over applying $E_j(k,b)$ to get the frequency-domain channel estimates.

To compute the channel estimate given in Equation (37), a M×P complex matrix (of received pilot data, Y) multiplied by a P×D complex matrix (called the primary weighting matrix where row d of this matrix is $E_j(k_d, b_d)$) is required per SDMA user. This represents a large number of computations that can be dramatically reduced if Equation (37) is modified so that a set of time-domain channel gains are found first instead of frequency-domain channel estimates and then efficient FFT processing is used to transform the time-domain channel estimates into the frequency-domain. The set of time domain channel gains are found by modeling the frequency-domain channel estimate as the DFT of L equally-spaced time-domain channel taps as follows:

$$\hat{H}_j(k, b) = \sum_{n=0}^{L-1} h_j(n, b) e^{-i2\pi k n / N} \qquad (38)$$

where $\hat{H}_j(k,b)$ is the auxiliary frequency-domain channel gains, $h_j(n,b)$ is the set of time-domain channel gains to be estimated, $e^{-i2\pi k n/N}$ is the set of time-to-frequency weighting coefficients, and N is an integer chosen to be larger than K (the total number of subcarriers) because in OFDM, the frequency-domain channel at subcarrier k=1 will not equal the channel at k=K+1. An implication of Equation (38) is that the time-domain channel taps need to be found at every baud where there is at least one data symbol. Also, the set of time domain taps can be easily generalized to an arbitrary index instead of being indexed from time 0 to L−1.

In deriving an expression for M×1 $h_j(n,b)$, the following analysis looks only at a single antenna, m, and solves the following minimization:

$$\min_{h_{j,m}(b)} |H_{j,m}(b) - G h_{j,m}(b)|^2 \qquad (39)$$

$$h_{j,m}(b) = \begin{bmatrix} h_{j,m}(0,b) \\ \vdots \\ h_{j,m}(L-1,b) \end{bmatrix}, H_{j,m}(b) = \begin{bmatrix} \hat{H}_{j,m}(1,b) \\ \vdots \\ \hat{H}_{j,m}(K,b) \end{bmatrix} \qquad (40)$$

$$G = \begin{bmatrix} f^H(0) \\ \vdots \\ f^H(K-1) \end{bmatrix}, f(k) = \begin{bmatrix} 1 \\ e^{j2\pi k/N} \\ \vdots \\ e^{j2\pi k(L-1)/N} \end{bmatrix} \qquad (41)$$

The least squares solution to equation (39) is:

$$h_{j,m}(b) = (G^H G)^{-1} G^H H_{j,m}(b) \qquad (42)$$

Therefore, $h_j(0,b)$ through $h_j(L−1,b)$ are given as:

$$\tilde{h}_j(b) = Y A_j(b) G^* (G^T G^*)^{-1} = Y Q_j(b) \qquad (43)$$

where:

$$\tilde{h}_j(b) = [h_j(0,b) | \ldots | h_j(L-1,b)], \qquad (44)$$
$$Q_j(b) = A_j(b) G^* (G^T G^*)^{-1}, \text{ and}$$
$$A_j(b) = [E_j(1,b) | \ldots | E_j(K,b)]$$

Once Equation (43) is solved, then an FFT is performed on each of the rows of the M×L matrix $\tilde{h}_j(b)$ to produce a frequency-domain channel estimate for each of the subcarriers of the $b^{th}$ signaling interval on each of the M antennas. The matrix $Q_j(b)$ (the frequency to reduced-time weighting coefficients) is computed at device initialization and not during real time operation of the communication receiver. Thus the computation of the reduced complexity estimator requires (at each signaling interval where there is at least one data symbol) J complex matrix-matrix multiplies of size M×P (Y) by P×L ($Q_j(b)$) and JM N point FFTs. For comparison with the frequency-domain approach, assume an OFDM system with J=3 SDMA users, M=8 antennas, B=11 bauds with the first, sixth and eleventh baud being all pilot symbols (P=1350, D=3600), N=512, K=450, and L=57. Then the number of complex multiplies required by the time-parameterized estimator is $$J(B-3)M(PL+(N/2)\log_2(N)) = 15,216,768 \qquad (45)$$

Compare this to an existing channel estimator which requires J(B−3)MPD=933,120,000 complex multiples. Thus, the time-parameterized version has 61.3 times fewer complex multiples with virtually the same performance.

Note that Equation (43) can be used to interpolate between channel estimates at different subcarriers and predict the channel at subcarriers beyond where the current estimator ends. This is because the FFT of the set of time-domain channel gains will provide channel estimates at all subcarriers even if the existing channel estimator does not provide estimates at those subcarriers.

The second embodiment of the reduced complexity estimator works by parameterizing each tap corresponding to a single lag value n or subcarrier k=n (represented by the entries in $h_j(n,b)$) by the IDFT of a small number of frequency-domain taps (referred to as Doppler taps). This is done akin to the above parameterization by parameterizing the time-varying $h_{j,m}(n,b)$ of user j on antenna m by $V_T$= (2V+1) time-invariant "Doppler" channels, $g_{j,m,v}(n)$ (v=−V, . . . ,+V) as given in the following equation:

$$h_{j,m}(n,b) = \sum_{v=-V}^{+V} g_{j,m,v}(n) e^{j2\pi v b/N_k} = c^H(b) g_{j,m}(n) \qquad (46)$$

where c(b) and $g_{j,m}(n)$ are $V_T$×1 vectors defined as:

$$c(b) = \begin{bmatrix} e^{j2\pi V b/N_k} \\ \vdots \\ e^{-j2\pi V b/N_k} \end{bmatrix}, g_{j,m}(n) = \begin{bmatrix} g_{j,m,-V}(n) \\ \vdots \\ g_{j,m,+V}(n) \end{bmatrix} \qquad (47)$$

We assume that the existing channel estimator can be expressed in the following form:

$$\tilde{h}_j(b) = Y Q_j(b) \qquad (48)$$

where Y is a M×P matrix of received pilot data, $Q_j(b)$ is the existing channel estimator (in the preferred embodiment, this is the same $Q_j(b)$ as in Equation (44)), and:

$$\tilde{h}_j(b) = [h_j(0,b) | \ldots | h_j(L-1,b)] \qquad (49)$$

The "Doppler" channels are found by solving the following equation in the least squares sense.

$$\min_{g_{j,m}(n)} |C g_{j,m}(n) - h_{j,m}(n)|^2 \qquad (50)$$

where C (B×$B_T$) and $h_j(n)$ (B×1) are:

$$C = \begin{bmatrix} c^H(1) \\ \vdots \\ c^H(B) \end{bmatrix}, h_{j,m}(n) = \begin{bmatrix} h_{j,m}(n,1) \\ \vdots \\ h_{j,m}(n,B) \end{bmatrix} \qquad (51)$$

The solution to Equation (50) is:

$$g_{j,m}(n) = (C^H C)^{-1} C^H h_{j,m}(n) \qquad (52)$$

The goal is to find the "Doppler" channels, $g_{j,m,v}(n)$, directly from the frequency-domain pilots through a matrix-matrix multiply. In equation form this is expressed as:

$$[g_{j,-v}(l) | \ldots | g_{j,+v}(l)] = Y Z_{j,l} \qquad (53)$$

where $$g_{j,v}(l) = \begin{bmatrix} g_{j,1,v}(l) \\ \vdots \\ g_{j,M,v}(l) \end{bmatrix}, Z_{j,l} = \tilde{Q}_{j,k} C^* (C^T C^*)^{-1},$$

$$\tilde{Q}_{j,l} = [\{Q_j(1)\}_l | \ldots | \{Q_j(B)\}_l], \text{ and}$$

$\{A\}_l$ means the $l^{th}$ column of matrix A.

When Equation (53) is solved, an efficient IFFT may be used to implement Equation (46) to produce the values of each time-tap of the time-domain channel estimate as a function of the signaling interval. Equation (53) can be used to interpolate the channel between times where the current estimator gives estimates. It can also be used to predict the channel at future or past times.

The third embodiment of the reduced complexity estimator is a combination of the first and second ways. This is done by using the $Q_j(b)$ of Equation (44) in Equation (48). Here $Z_{j,l}$ is referred to as the reduced time to reduced frequency weighting coefficients. The computational complexity for the Doppler channel parameterization of the existing channel estimator in number of complex multiplies is (for the above example with V=1, $V_T$=3): $JV_TM(PL+(N/2)\log_2(N))$=5,706,288. This has 163.5 times less complex multiplies than the frequency-domain existing channel estimator and 2.67 times fewer complex multiplies than the time-domain only parameterization of the existing channel estimator with nearly identical performance.

Figure 7:
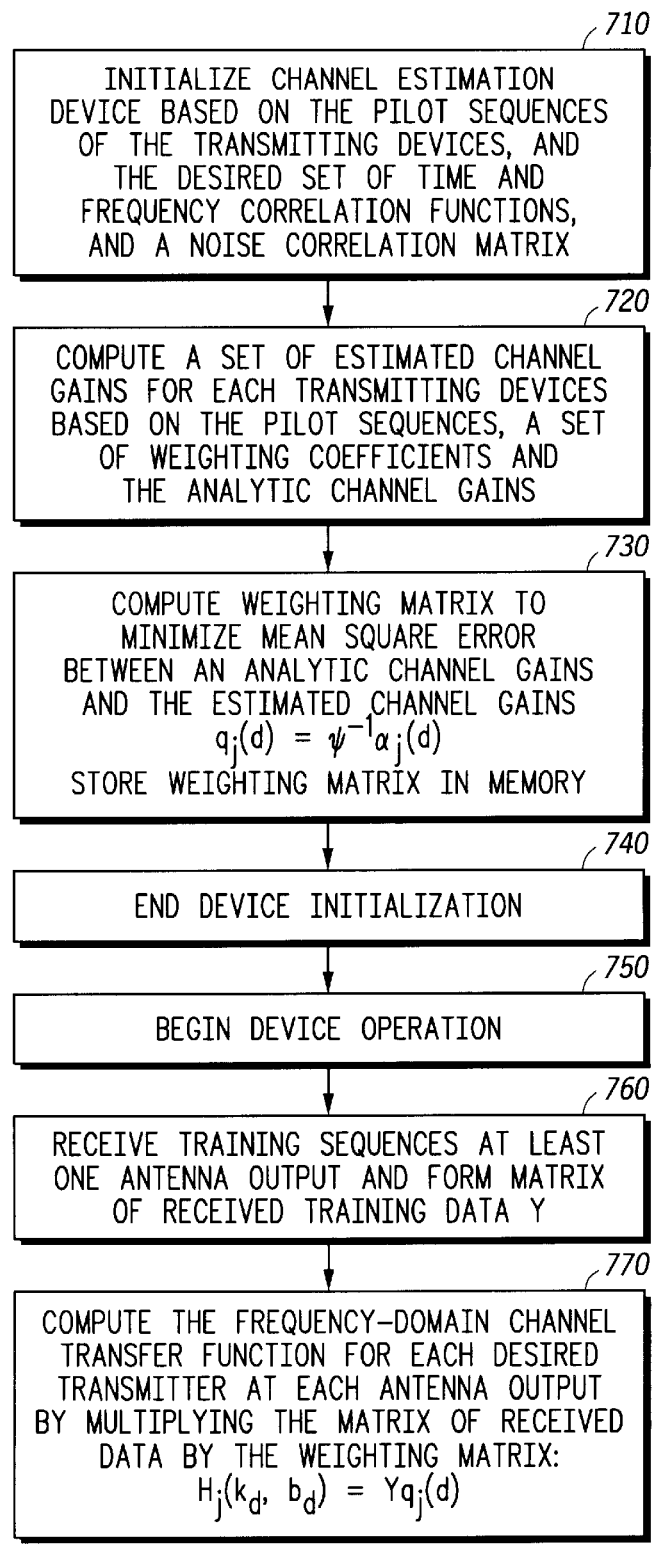
FIG. 7 is a flow chart representation of a method performed by a preferred embodiment of the Channel Estimation Device of FIG. 5 to provide channel estimates between a transmitting device and a receiving antenna in accordance with the present invention.

FIG. 7 is a flow chart representation of the method performed by a preferred embodiment of the channel estimation device of 500 to compute the channel gain between at least one transmitting device and at least one receiving antenna in accordance with the present invention. The first step 710 is to initialize the channel estimation device of the present invention based on the choice of time and frequency correlation functions $r_T(n)$ and $r_F(f)$, respectively, a noise correlation matrix, and the pilot sequences of the transmitting devices. The frequency correlation function is a sampled continuous frequency correlation based on the Fourier Transform of a square delay profile in the continuous time-domain, as shown in equation (20). The time correlation function is associated with a flat Doppler spectrum, as shown in equation (21). A set of estimated channel gains is compiled 720 as a function of the pilot sequences, a set of analytical channel gains variables, and a set of weighting coefficients variables. The weighting coefficients $q_j(d)$ are computed as a function of time and frequency correlation functions $r_T(n)$ and $r_F(f)$ a noise correlation matrix, and the pilot sequences of the transmitting devices 725. The weighting coefficients are collected into a weighting matrix 730 and stored in memory. Initialization of the channel estimation device completes at 740. Normal operating mode commences 750, and the receiving device receives data 760 over an information burst 410 and collects the data received during the training symbol interval 420 into a matrix of received training data Y. The device computes the frequency-domain channel gains for each desired transmitter at each antenna by multiplying the matrix of received data Y by the weighting matrix 770.

Figure 8:
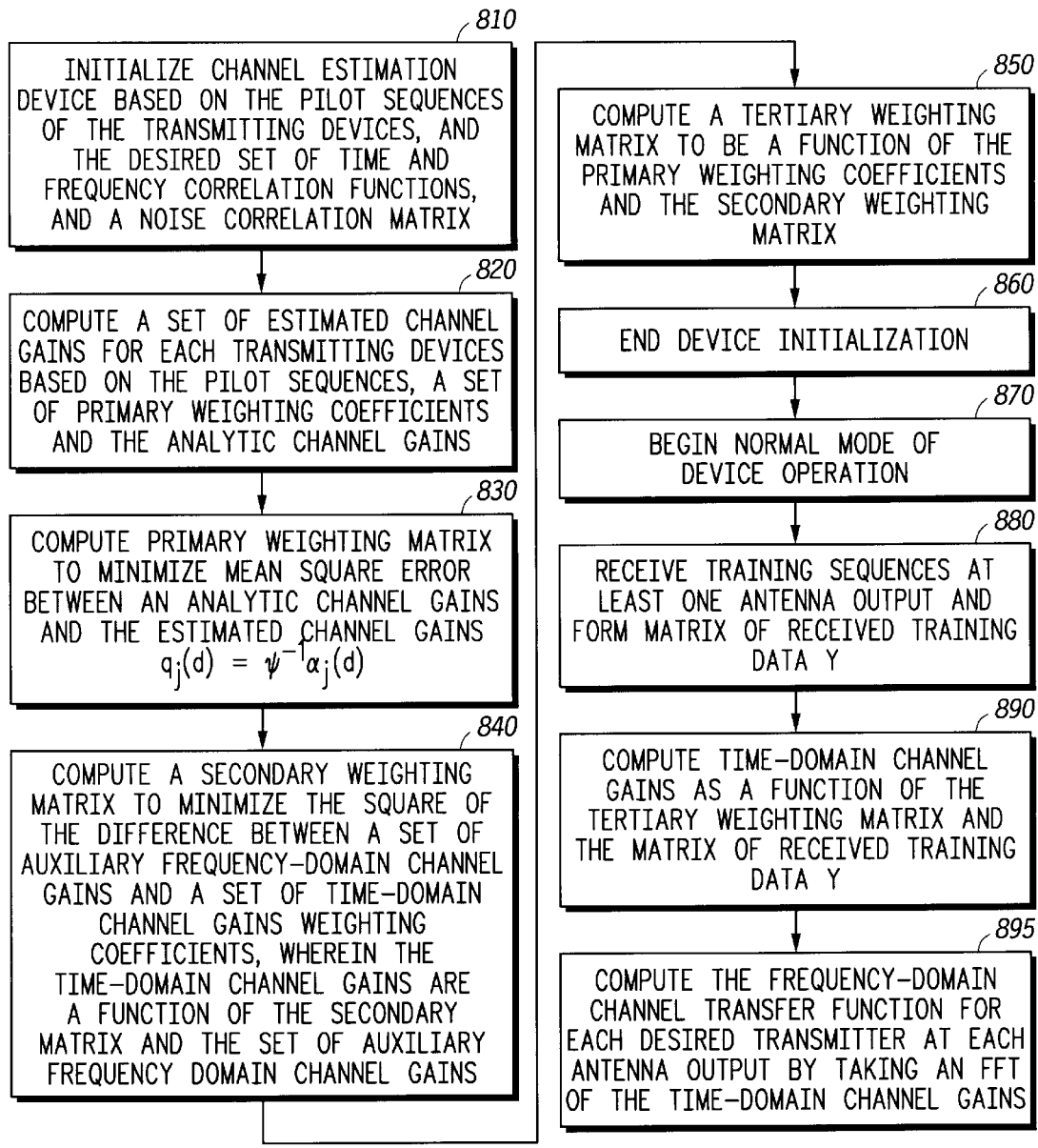
FIG. 8 is a flow chart representation of another method performed by a preferred embodiment of the Channel Estimation Device of FIG. 5 to provide frequency domain channel estimates between a transmitting device and a receiving antenna utilizing reduced computational complexity in accordance with the present invention.

FIG. 8 is a flow chart representation of steps performed by the channel estimation device of 500 to provide frequency domain channel estimates between a transmitting device and a receiving antenna utilizing reduced computational complexity in accordance with the present invention. Device initialization is begun 805 when a primary weighting matrix is provided 810. The primary weighting matrix for desired transmitter j at frequency k and time b are denoted as $E_j(k,b)$. In a preferred embodiment, $E_j(k,b)$ equals $\Psi^{-1}\alpha_j(k,b)$ of Equation (14)), but $E_j(k,b)$ may be provided as an alternative equation from any embodiment using the $\hat{H}_j(k,b)=YE_j(k,b)$ structure. Next, 820 a frequency-interpolation matrix is computed as the minimization of the square of the difference between a set of auxiliary frequency-domain channel gains variables H, and a set of time-domain channel gains variables h, weighted by a set of auxiliary weighting coefficients. In equation form, this minimization is expressed as $$\min_{h_{j,m}(b)}|H_{j,m}(b)-Gh_{j,m}(b)|^2,$$

where $h_{j,m}(b)$ is the set of time-domain channel gains, $H_{j,m}(b)$ is the set of auxiliary frequency-domain channel gains, and G is the set of auxiliary weighting coefficients who's value is defined by equation (25). The above equation is solved by the frequency-interpolation matrix and is expressed as $(G^HG)^{-1}G^H$. A final weighting matrix is computed as a function of the primary weighting matrix and the transpose of the frequency-interpolation matrix 830 thus completing the device initialization 840. In equation form, the final weighting matrix $Q_j(b)$ is expressed as $Q_j(b)=A_j(b)G^*(G^TG^*)^{-1}$, where $$A_j(b)=[E_j(1,b)|\ldots|E_j(K,b)].$$

The normal mode of device operation begins 850 when a matrix of received training data Y, is compiled from the received training sequences 860 at a least one antenna output. Time-domain channel gains are computed 870 as a function of the final weighting matrix and the matrix of received training data and is expressed as $\bar{h}_j(b)=YQ_j(b)$, where $$\bar{h}_j(b)=[h_j(0,b)|\ldots|h_j(L-1,b)]$$

and $h_j(l,b)=[h_{j,1}(l,b),\ldots,h_{j,M}(l,b)]^T$. Finally, the frequency-domain channel transfer gains for each desired transmitter at each antenna output is computed as the DFT of the time-domain channel gains 880.

Figure 9:
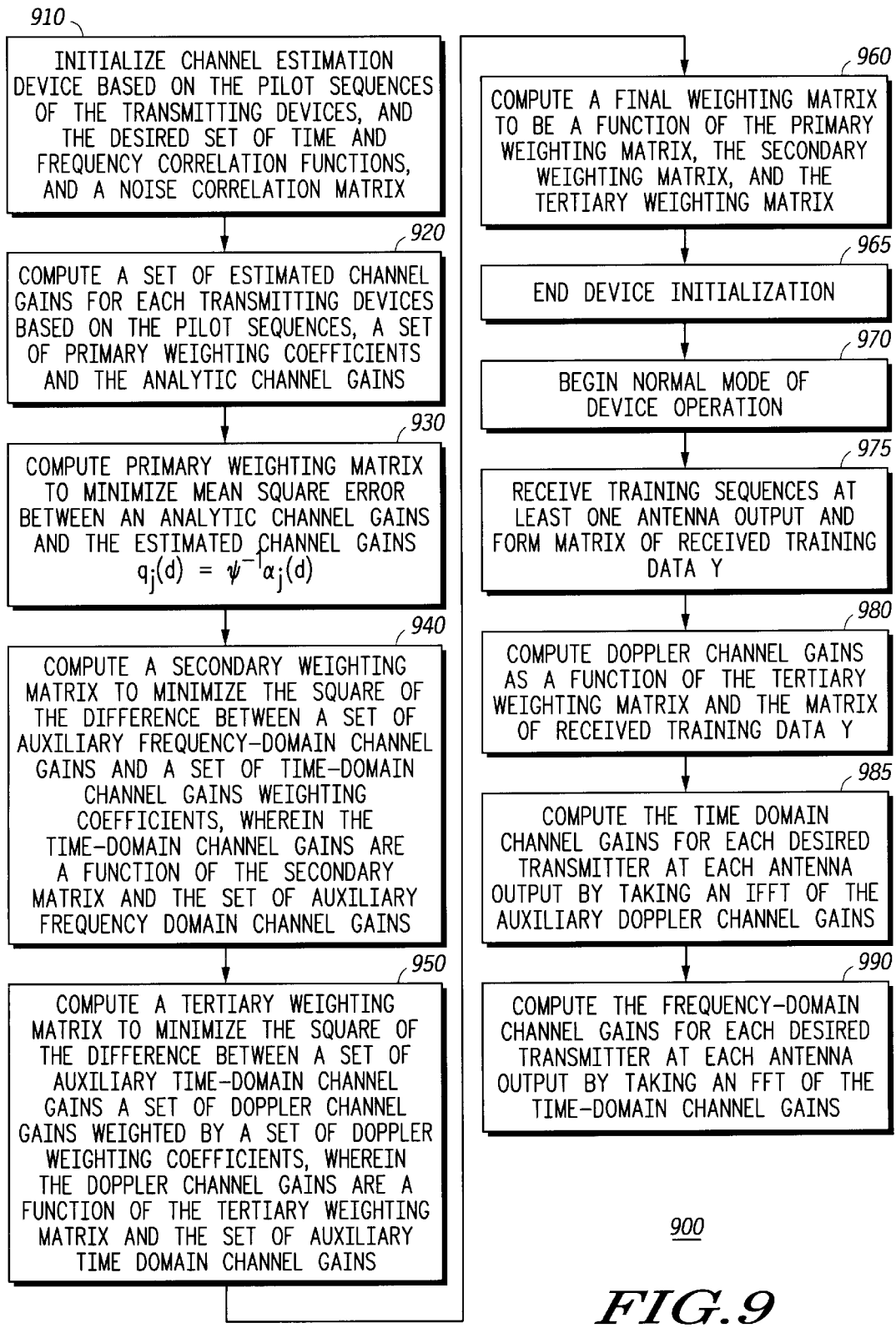
FIG. 9 is a flow chart representation of another method performed by a preferred embodiment of the Channel Estimation Device of FIG. 5 to provide frequency domain channel estimates between a transmitting device and a receiving antenna utilizing frequency interpolation in accordance with the present invention.

FIG. 9 is a flow chart representation of steps performed by the Channel Estimation Device of 500 to provide frequency domain channel estimates between a transmitting device and a receiving antenna utilizing frequency interpolation in accordance with the present invention. Device initialization begins 905 with the computing of a frequency-interpolation matrix. The matrix is computed as the minimization of the square of the difference between a set of auxiliary frequency-domain channel gains variables H, at a set of frequencies, and a set of time-domain channel gains variables h, weighted by a set of auxiliary weighting coefficients 910. In equation form, this minimization is expressed as $$\min_{h_{j,m}(b)}|H_{j,m}(b)-Gh_{j,m}(b)|^2,$$

where $h_{j,m}(b)$ is the set of time-domain channel gains, $H_{j,m}(b)$ is the set of auxiliary frequency-domain channel gains at a set of frequencies $k_1$ through $k_K$, and G is the set of auxiliary weighting coefficients who's value is defined below. An example set of frequencies is $k_1=1, k_2=3, \ldots, k_{256}=511$. One embodiment of the present invention would be provided channel estimates at the above set of frequencies and the present invention would interpolate the provided channel estimates to the even frequencies 2, 4, . . . 512. The frequency-interpolation matrix solves the equation for the weighting coefficient set as $(G^HG)^{-1}G^H$ which ends the device initialization 920. The structure of $h_{j,m}(b)$, $$H_{j,m}(b), \text{ and } G \text{ are } h_{j,m}(b) = \begin{bmatrix} h_{j,m}(0,b) \\ \vdots \\ h_{j,m}(L-1,b) \end{bmatrix},$$

$$H_{j,m}(b) = \begin{bmatrix} \hat{H}_{j,m}(k_1, b) \\ \vdots \\ \hat{H}_{j,m}(k_K, b) \end{bmatrix}, \text{ and } G = \begin{bmatrix} f^H(k_1) \\ \vdots \\ f^H(k_K - 1) \end{bmatrix},$$

$$f(k) = \begin{bmatrix} 1 \\ e^{j2\pi k/N} \\ \vdots \\ e^{j2\pi k(L-1)/N} \end{bmatrix}.$$

In 930, the normal mode of device operation starts with channel estimates being provided at the set of frequencies $\hat{H}_{j,m}(b)$, for at least one desired transmitter and at least one antenna 940. Time-domain channel gains are computed as a function of the frequency-interpolation matrix and the channel estimates at the set of frequencies 950. The equation is illustrated as $h_{j,m}(b) = (G^H G)^{-1} G^H \hat{H}_{j,m}(b)$, where $$\hat{H}_{j,m}(b) = \begin{bmatrix} \hat{H}_{j,m}(k_1, b) \\ \vdots \\ \hat{H}_{j,m}(k_K, b) \end{bmatrix}$$

and $\hat{H}_{j,m}(k,b)$ is the channel estimate on antenna m for desired transmitter j at frequency k and time b. The frequency-domain channel gains for each desired transmitter at each antenna output are computed as the DFT of the time-domain channel gains, completing the device operation 960.

Figure 10:
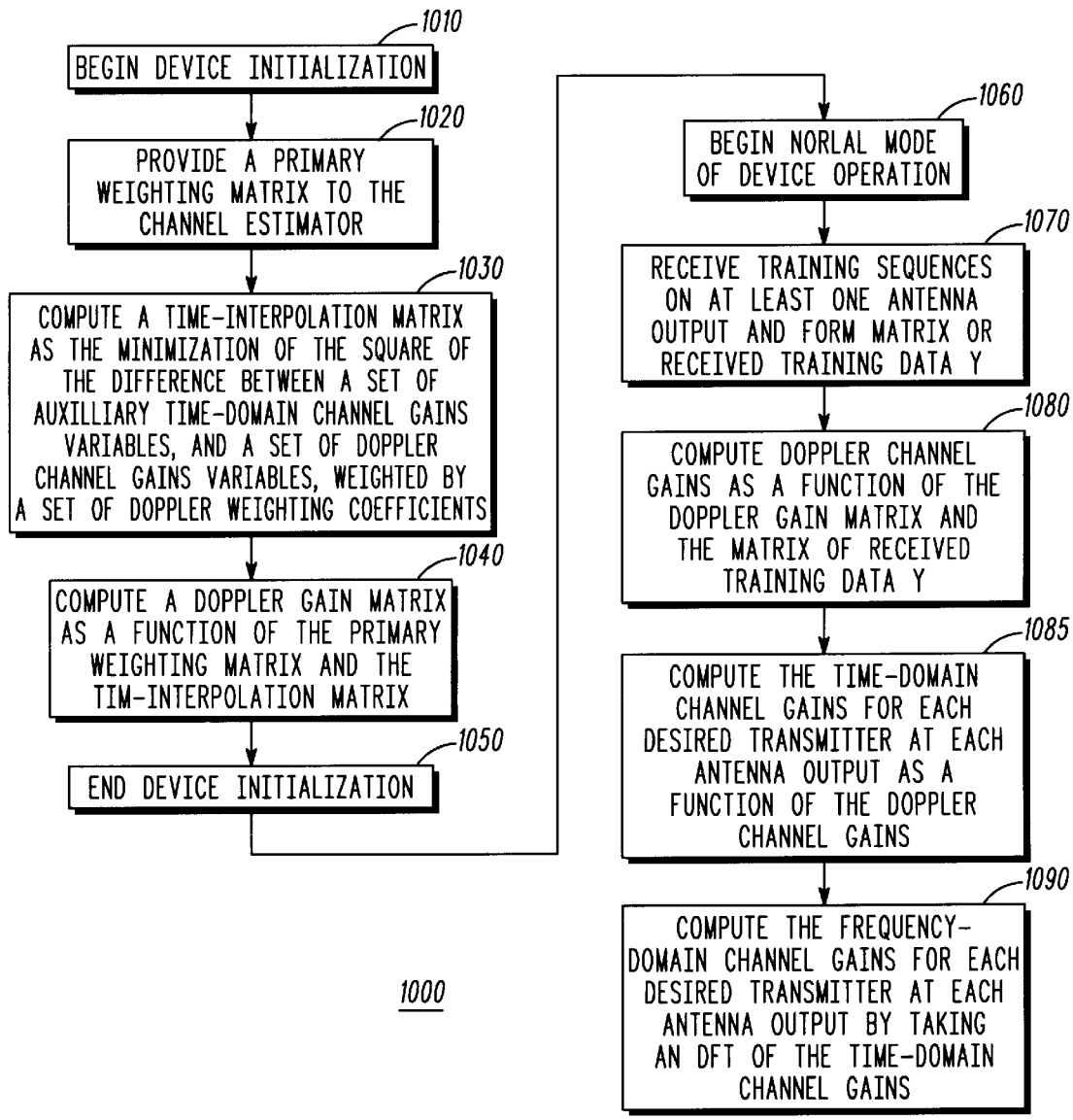
FIG. 10 is a flow chart representation of another method performed by a preferred embodiment of the Channel Estimation Device of FIG. 5 to provide time domain channel estimates between a transmitting device and a receiving antenna utilizing reduced computational complexity in accordance with the present invention.

FIG. 10 is a flow chart representation of steps performed by the Channel Estimation Device of 500 to provide time domain channel estimates between a transmitting device and a receiving antenna utilizing reduced computational complexity in accordance with the present invention. Device initialization begins 1010 with the channel estimator being provided a primary weighting matrix 1020. The primary weighting matrix for desired transmitter j at frequency k and time b are denoted as $Q_j(b)$. In the preferred embodiment, $Q_j(b)$ equals $Q_j(b) = A_j(b) \tilde{G}^*(G^T G^*)^{-1}$ as defined by equation (44), but $Q_j(b)$ may be provided as an alternative equation from any embodiment using the $\hat{h}_j(b) = YQ_j(b)$ structure. A time-interpolation matrix is computed 1030 as the minimization of the square of the difference between a set of auxiliary time-domain channel gains variables $h_{j,m}(n)$ at a set of times $b_1$ through $b_B$, and a set of Doppler channel gains variables $g_{j,m}(n)$, weighted by a set of Doppler weighting coefficients C who's value is defined below. In equation form this is expressed as $$\min_{g_{j,m}(n)} |Cg_{j,m}(n) - h_{j,m}(n)|^2,$$

where C (B×$B_T$) and $h_j(n)$ (B×1) are $$C = \begin{bmatrix} c^H(b_1) \\ \vdots \\ c^H(b_B) \end{bmatrix}, h_{j,m}(n) = \begin{bmatrix} h_{j,m}(n, b_1) \\ \vdots \\ h_{j,m}(n, b_B) \end{bmatrix}.$$

The time-interpolation matrix that solves the minimization problem is $(C^H C)^{-1} C^H$. A Doppler gain matrix $Z_{j,l}$ is computed 1040 as a function of the primary weighting matrix and the transpose of the time-interpolation matrix by the equation $$Z_{j,l} = \tilde{Q}_{j,l} C^*(C^T C^*)^{-1},$$

where $\tilde{Q}_{j,l} = [\{Q_j(b_1)\}_l | \ldots |\{Q_j(b_B)\}_l]$. The device initialization ends 1050 and the normal device operation begins 1060 with the device receiving the training sequences on at least one antenna output thus forming 1070 the matrix of received training data Y. Next, the Doppler channels $g_{j,m,\nu}(n)$, are found as a function of the Doppler gain matrix and the matrix of received training data 1080. In equation form this is expressed as $[g_{j,-\nu}(l) | \ldots | g_{j,+\nu}(l)] = YZ_{j,l}$, where $$g_{j,\nu}(l) = \begin{bmatrix} g_{j,1,\nu}(l) \\ \vdots \\ g_{j,M,\nu}(l) \end{bmatrix}.$$

The time-domain channel gains $h_{j,m}(n,b)$ for each desired transmitter at each antenna output is computed as a function of the Doppler channel gains 1085, and is equated as $$h_{j,m}(n, b) = \sum_{\nu=-V}^{+V} g_{j,m,\nu}(n) e^{j2\pi \nu b/N_k} = c^H(b) g_{j,m}(n).$$

Finally, frequency-domain channel gains for each desired transmitter at each antenna output are computed as the DFT of the time-domain channel gains 1090.

Figure 11:
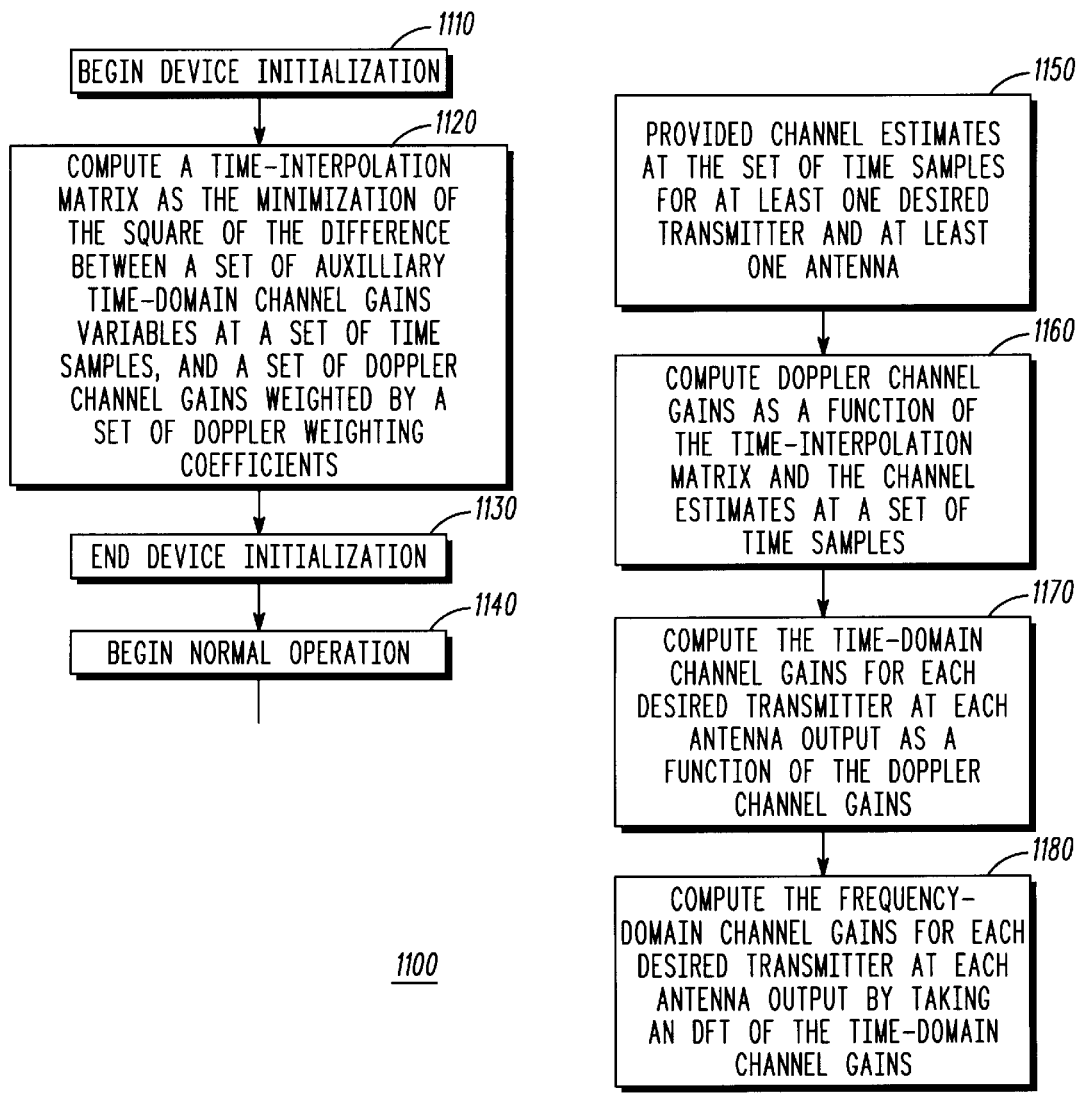
FIG. 11 is a flow chart representation of another method performed by a preferred embodiment of the Channel Estimation Device of FIG. 5 to provide time domain channel estimates between a transmitting device and a receiving antenna utilizing time interpolation in accordance with the present invention.

FIG. 11 is a flow chart representation of steps performed by the Channel Estimation Device of 500 to provide time domain channel estimates between a transmitting device and a receiving antenna utilizing time interpolation in accordance with the present invention. The device initialization begins 1110 with a time-interpolation matrix being computed 1120 as the minimization of the square of the difference between a set of auxiliary time-domain channel gains variables $h_{j,m}(n)$ at a set of times $b_1$ through $b_B$, and a set of Doppler channel gains $g_{j,m}(n)$, weighted by a set of Doppler weighting coefficients C who's value is defined below. In equation form this is expressed as $$\min_{g_{j,m}(n)} |Cg_{j,m}(n) - h_{j,m}(n)|^2,$$

where C (B×$B_T$) and $h_j(n)$ (B×1) are $$C = \begin{bmatrix} c^H(b_1) \\ \vdots \\ c^H(b_B) \end{bmatrix}, h_{j,m}(n) = \begin{bmatrix} h_{j,m}(n, b_1) \\ \vdots \\ h_{j,m}(n, b_B) \end{bmatrix}.$$

The time-interpolation matrix that solves the minimization problem is $(C^H C)^{-1} C^H$. Here the device initialization ends 1130 and normal device operation begins 1140 with the induction of channel estimates at a set of time samples $\hat{h}_{j,m}(n)$, for at least one desired transmitter 1150. Doppler channel gains $g_{j,m,\nu}(n)$, are computed 1160 as a function of the Doppler gain matrix and the channel estimates at the set of time samples and are expressed as $g_{j,m}(n) = (C^H C)^{-1} C^H \hat{h}_{j,m}(n)$, where $$\hat{h}_{j,m}(n) = \begin{bmatrix} \hat{h}_{j,m}(n, b_1) \\ \vdots \\ \hat{h}_{j,m}(n, b_B) \end{bmatrix}.$$

The time-domain channel gains $h_{j,m}(n,b)$ for each desired transmitter at each antenna output are 1170 computed as a function of the Doppler channel gains $$h_{j,m}(n, b) = \sum_{v=-V}^{+V} g_{j,m,v}(n)e^{j2\pi vb/N_k} = c^H(b)g_{j,m}(n).$$

Finally, 1180 frequency-domain channel gains for each desired transmitter at each antenna output are computed as the DFT of the time-domain channel gains.

The present invention may be embodied in other specific forms without departing from its spirit or essential characteristics. The described embodiments are to be considered in all respects only as illustrative and not restrictive.

We claim:

1. A method of operating a communication system including at least one receiver and at least one transmitter comprising:
   computing a plurality of weighting coefficients as a function of time and frequency correlation functions, a noise correlation matrix, and pilot sequences;
   computing a weighting matrix from the weighting coefficients;
   receiving a training sequence from at least one transmitter;
   computing a received data matrix from the training sequence;
   computing an estimated channel gain for each transmitter from the weighting matrix, and the received data matrix; and
   passing each of the estimated channel gains to the receiver to recover a plurality of transmitted data symbols, wherein the estimated channel gains $H_j(k_d,b_d)$ are computed as a function of $\Sigma Y(f_p,t_p,)q_j(d,f_p,t_p)$.

2. The method of claim 1 further comprising initializing a channel estimation device based on a pilot sequence of the transmitter, a desired set of time and frequency correlation functions, and a noise correlation matrix.

3. The method of claim 1 wherein the weighting coefficients are computed according to $q_j(d)=\Psi^{-1}\alpha_j(d)$.

4. The method of claim 1 wherein the estimated channel gains are computed according to $\hat{H}_j(k_d,b_d)=Y\Psi^{-1}\alpha_j(d)$ where Y is the received data.

5. A method of operating a communication system including at least one receiver and at least one transmitter comprising:
   computing a frequency-interpolation matrix as a function of auxiliary frequency-domain channel gains variables, a set of time domain channel gains variables, and a predefined set of auxiliary weighting coefficients;
   computing a final weighting matrix as a function of a provided primary weighting matrix, and the frequency-interpolation matrix;
   receiving a plurality of training sequences from at least one antenna;
   assembling a matrix of received training data from the training sequences;
   computing a plurality of time-domain channel gains for each transmitter as a product of the final weighting matrix and the received data matrix;
   computing a frequency-domain channel gains by taking a DFT of the time-domain channel gains; and
   passing each frequency-domain channel gains to the receiver to recover a plurality of transmitted data symbols.

6. The method of claim 5 further comprising computing a plurality of time-domain channel gains as a function of the frequency-interpolation matrix and a plurality of provided channel estimates.

7. The method of claim 5 wherein the primary weighting matrix is $E_j(k,b)$ and equals $\Psi^{-1}\alpha_j(k,b)$.

8. The method of claim 5 wherein the frequency-interpolation matrix is $(G^H G)^{-1}G^H$ and is derived from $$\min_{h_{j,m}(b)} |H_{j,m}(b) - Gh_{j,m}(b)|^2,$$

where $h_{j,m}(b)$ is the set of time-domain channel gains, $H_{j,m}(b)$ is the set of auxiliary frequency-domain channel gains, and G is the set of auxiliary weighting coefficients defined as $$G = \begin{bmatrix} f^H(0) \\ \vdots \\ f^H(K-1) \end{bmatrix}, f(k) = \begin{bmatrix} 1 \\ e^{j2\pi k/N} \\ \vdots \\ e^{j2\pi k(L-1)/N} \end{bmatrix}.$$

9. The method of claim 5 wherein the final weighting matrix $Q_j(b)$ is $Q_j(b)=A_j(b)G^*(G^TG^*)^{-1}$, where $A_j(b)=[E_j(1,b)| \ldots |E_j(K,b)]$.

10. The method of claim 5 wherein the time-domain channel gains are $h_{j,m}(b)=(G^H G)^{-1}G^H \hat{H}_{j,m}(b)$, where $$\hat{H}_{j,m}(b) = \begin{bmatrix} \hat{H}_{j,m}(k_1, b) \\ \vdots \\ \hat{H}_{j,m}(k_K, b) \end{bmatrix}$$

and $\hat{H}_{j,m}(k,b)$ is the channel estimate on antenna m for desired transmitter j at frequency k and time b.

11. A method of operating a communication system including at least one receiver and at least one transmitter comprising:
   computing a time-interpolation matrix as a function of auxiliary time-domain channel gains variables, a set of Doppler channel gains variables, and a predefined set of Doppler weighting coefficients;
   computing a Doppler gain matrix as a function of a provided primary weighting matrix, and the time-interpolation matrix;
   receiving training sequences from at least one antenna;
   assembling a matrix of received training data from the training sequences;
   computing a plurality of Doppler channel gains as a function of the Doppler gain matrix and the matrix of received training data;
   computing a plurality of time-domain channel gains as a function of the Doppler channel gains;
   computing a frequency-domain channel gains by taking a DFT of the time-domain channel gains; and
   passing each frequency-domain channel gains to the receiver to recover a plurality of transmitted data symbols.

12. The method of claim 11 further comprising computing a plurality of Doppler channel gains as a function of the time-interpolation matrix and a plurality of provided channel estimates.

13. The method of claim 11 wherein the primary weighting matrix for desired transmitter j at frequency k and time b is $Q_j(b)$ and equals $Q_j(b)=A_j(b)G^*(G^TG^*)^{-1}$.

14. The method of claim 11 wherein the time-interpolation matrix is $(C^H C)^{-1} C^H$ and is derived from $$\min_{g_{j,m}(n)} |C g_{j,m}(n) - h_{j,m}(n)|^2,$$

where C (B×B$_T$) and h$_j$(n) (B×1) are $$C = \begin{bmatrix} c^H(b_1) \\ \vdots \\ c^H(b_B) \end{bmatrix}, h_{j,m}(n) = \begin{bmatrix} h_{j,m}(n, b_1) \\ \vdots \\ h_{j,m}(n, b_B) \end{bmatrix},$$

where $h_{j,m}(n)$ is the auxiliary time-domain channel gains variables at a set of times $b_1$ through $b_B$, $g_{j,m}(n)$ is a set of Doppler channel gains variables, and C is a set of Doppler weighting coefficients defined as $$c(b) = \begin{bmatrix} e^{j2\pi V b/N_k} \\ \vdots \\ e^{-j2\pi V b/N_k} \end{bmatrix}, g_{j,m}(n) = \begin{bmatrix} g_{j,m,-V}(n) \\ \vdots \\ g_{j,m,+V}(n) \end{bmatrix}$$

and $$C = \begin{bmatrix} c^H(1) \\ \vdots \\ c^H(B) \end{bmatrix}, h_{j,m}(n) = \begin{bmatrix} h_{j,m}(n, 1) \\ \vdots \\ h_{j,m}(n, B) \end{bmatrix}.$$

15. The method of claim 11 wherein the Doppler gain matrix $Z_{j,l}$ is $Z_{j,l} = \tilde{Q}_{j,l} C^* (C^T C^*)^{-1}$, where $\tilde{Q}_{j,l} = [\{Q_j(b_1)\}_l \ldots |\{Q_j(b_B)\}_l]$.

16. The method of claim 11 wherein the Doppler channels $$g_{j,v}(l) = \begin{bmatrix} g_{j,1,v}(l) \\ \vdots \\ g_{j,M,v}(l) \end{bmatrix}.$$

17. The method of claim 11 wherein the time-domain channel gains $$h_{j,m}(n, b) \text{ is } h_{j,m}(n, b) = \sum_{v=-V}^{+V} g_{j,m,v}(n) e^{j2\pi v b/N_k} = c^H(b) g_{j,m}(n).$$

18. A receiver for a wireless communication system comprising:
means for computing a plurality of weighting coefficients as a function of time and frequency correlation functions, a noise correlation matrix, and pilot sequences;
means for computing a weighting matrix from the weighting coefficients;
means for receiving a training sequence from at least one transmitter;
means for computing a received data matrix from the training sequence; and
means for computing from the weighting matrix, and the received data matrix estimated channel gains wherein the estimated channel gains $H_j(k_d, b_d)$ are computed as a function of $\Sigma Y(f_p, t_p,) q_j(d, f_p, t_p)$.

19. A receiver for a wireless communication system comprising:
means for computing a frequency-interpolation matrix as a function of auxiliary frequency-domain channel gains variables, a set of time domain channel gains variables, and a predefined set of auxiliary weighting coefficients;
means for computing a final weighting matrix as a function of a provided primary weighting matrix, and the frequency-interpolation matrix;
means for receiving a plurality of training sequences from at least one antenna;
means for assembling a matrix of received training data from the training sequences;
means for computing a plurality of time-domain channel gains for each transmitter as a product of the final weighting matrix and the received data matrix; and
means for computing a frequency-domain channel gains by taking a DFT of the time-domain channel gains.

20. The means of claim 19 further comprising computing a plurality of time-domain channel gains as a function of the frequency-interpolation matrix and a plurality of provided channel estimates.

21. A receiver for a wireless communication system comprising:
means for computing a time-interpolation matrix as a function of auxiliary time-domain channel gains variables, a set of Doppler channel gains variables, and a predefined set of Doppler weighting coefficients;
means for computing a Doppler gain matrix as a function of a provided primary weighting matrix, and the time-interpolation matrix;
means for receiving training sequences from at least one antenna;
means for assembling a matrix of received training data from the training sequences;
means for computing a plurality of Doppler channel gains as a function of the Doppler gain matrix and the matrix of received training data;
means for computing a plurality of time-domain channel gains as a function of the Doppler channel gains; and
means for computing a frequency-domain channel gains by taking a DFT of the time-domain channel gains.

22. The means of claim 21 further comprising computing a plurality of Doppler channel gains as a function of the time-interpolation matrix and a plurality of provided channel estimates.

23. A computer readable medium storing a computer program comprising:
computer readable program code for computing a frequency-interpolation matrix as a function of auxiliary frequency-domain channel gains variables, a set of time domain channel gains variables, and a predefined set of auxiliary weighting coefficients;
computer readable program code for computing a final weighting matrix as a function of a provided primary weighting matrix, and the frequency-interpolation matrix;
computer readable program code for receiving a plurality of training sequences from at least one antenna;
computer readable program code for assembling a matrix of received training data from the training sequences;
computer readable program code for computing a plurality of time-domain channel gains for each transmitter as a product of the final weighting matrix and the received data matrix; and computer readable program code for computing a frequency-domain channel gains by taking a DFT of the time-domain channel gains.

24. The medium of claim 23 further comprising of computer readable code for computing a plurality of time-domain channel gains as a function of the frequency-interpolation matrix and a plurality of provided channel estimates.

25. A computer readable medium storing a computer program comprising:

computer readable code for computing a time-interpolation matrix as a function of auxiliary time-domain channel gains variables, a set of Doppler channel gains variables, and a predefined set of Doppler weighting coefficients;

computer readable code for computing a Doppler gain matrix as a function of a provided primary weighting matrix, and the time-interpolation matrix;

computer readable code for receiving training sequences from at least one antenna;

computer readable code for assembling a matrix of received training data from the training sequences;

computer readable code for computing a plurality of Doppler channel gains as a function of the Doppler gain matrix and the matrix of received training data;

computer readable code for computing a plurality of time-domain channel gains as a function of the Doppler channel gains; and computer readable code for computing a frequency-domain channel gains by taking a DFT of the time-domain channel gains.

26. The medium of claim 25 further comprising of computer readable code for computing a plurality of Doppler channel gains as a function of the time-interpolation matrix and a plurality of provided channel estimates.

* * * * *